(12) United States Patent
Gray et al.

(10) Patent No.: US 12,031,029 B2
(45) Date of Patent: *Jul. 9, 2024

(54) STABLE IMMOBILIZED AMINE SORBENTS FOR REE AND HEAVY METAL RECOVERY FROM LIQUID SOURCES

(71) Applicant: United States Department of Energy, Washington, DC (US)

(72) Inventors: Mcmahan L. Gray, Pittsburgh, PA (US); Brian W. Kail, Pittsburgh, PA (US); Walter C. Wilfong, Jefferson Hills, PA (US); Qiuming Wang, South Park, PA (US)

(73) Assignee: United States Department of Energy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,617

(22) Filed: Nov. 22, 2022

(65) Prior Publication Data

US 2023/0112681 A1 Apr. 13, 2023

Related U.S. Application Data

(62) Division of application No. 15/782,315, filed on Oct. 12, 2017, now abandoned.

(60) Provisional application No. 62/407,124, filed on Oct. 12, 2016.

(51) Int. Cl.
| | |
|---|---|
| *C08L 79/02* | (2006.01) |
| *C01F 11/00* | (2006.01) |
| *C07F 7/08* | (2006.01) |
| *C08G 73/02* | (2006.01) |
| *C08K 3/36* | (2006.01) |
| *C08K 5/5419* | (2006.01) |
| *C08K 7/14* | (2006.01) |

(52) U.S. Cl.
CPC ............ *C08L 79/02* (2013.01); *C01F 11/005* (2013.01); *C07F 7/0812* (2013.01); *C08G 73/0206* (2013.01); *C08K 3/36* (2013.01); *C08K 5/5419* (2013.01); *B01D 2252/20415* (2013.01); *B01D 2257/60* (2013.01); *C08K 7/14* (2013.01)

(58) Field of Classification Search
None
See application file for complete search history.

(56) References Cited

U.S. PATENT DOCUMENTS

| | | | | |
|---|---|---|---|---|
| 2011/0084421 A1* | 4/2011 | Soane | ....................... | C09D 7/65 |
| | | | | 524/588 |
| 2011/0186522 A1* | 8/2011 | Martin | ..................... | C02F 1/281 |
| | | | | 210/683 |
| 2013/0029843 A1* | 1/2013 | Edmiston | ........... | B01J 20/28073 |
| | | | | 502/401 |

FOREIGN PATENT DOCUMENTS

CN 102731795 A 10/2012

OTHER PUBLICATIONS

Ghoul et al. (Water Research, 37, 2003, 729-734). "Uptake of heavy metals from synthetic aqueous solutions using modified PEI-silica gels" (Year: 2003).*

* cited by examiner

*Primary Examiner* — Ryan B Huang
(74) *Attorney, Agent, or Firm* — Aaron R. Keith; Timothy L. Harney; Michael J. Dobbs

(57) ABSTRACT

Materials, methods of making, and methods of using a stable and regenerable immobilized amine sorbents for rare earth element and heavy metal recovery from liquid sources. Embodiments of the invention relate to the novel combination of different polyamines, primarily polyethylenimine Mw=800 ($PEI_{800}$), and an epoxysilane, namely 2-(3,4-epoxycyclohexyl)ethyltrimethoxysilane (ECTMS), covalently immobilizing theREE and heavy metal-adsorbing amine sites within low cost, porous silica particles.

23 Claims, 12 Drawing Sheets

Fig. 13A
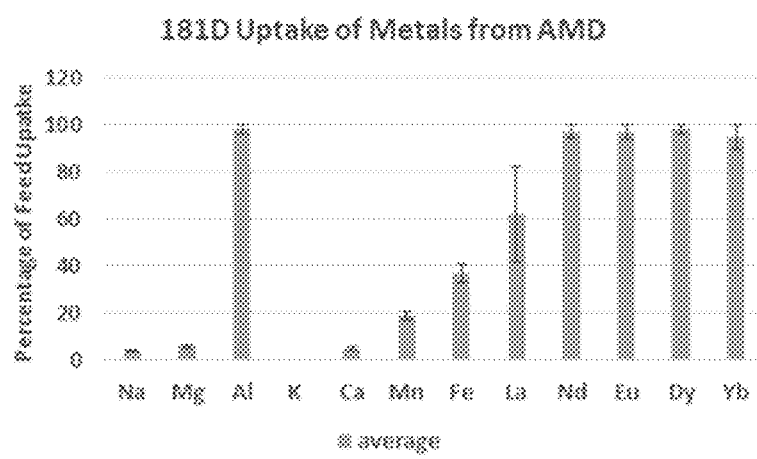
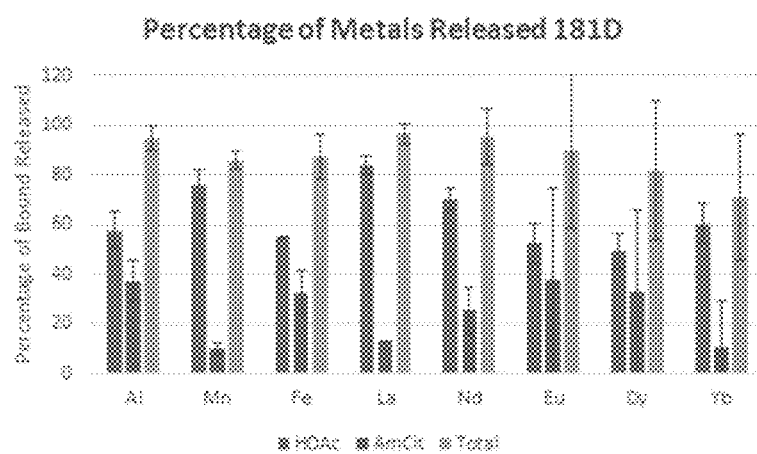
Fig. 13B

STABLE IMMOBILIZED AMINE SORBENTS FOR REE AND HEAVY METAL RECOVERY FROM LIQUID SOURCES

CROSS-REFERENCE TO RELATED APPLICATIONS

This application claims priority benefit as a divisional of U.S. Non-Provisional patent application Ser. No. 15/782,315 filed Oct. 12, 2017, currently pending, which in turn claimed priority benefit as a Non-Provisional of U.S. Provisional Patent Application 62/407,124 filed Oct. 12, 2016, both of which are incorporated herein by reference in their entirety herein.

STATEMENT OF GOVERNMENT SUPPORT

The United States Government has rights in this invention pursuant to an employer/employee relationship between the inventors and the U.S. Department of Energy, operators of the National Energy Technology Laboratory (NETL), the Oak Ridge Institute for Science and Education, and a contract with AECOM operating under RES contract No. DEFE0004000.

FIELD OF THE INVENTION

One or more embodiments consistent with the present disclosure relate to capturing a variety of rare earth elements (REE) and heavy metals, and includes materials, methods of their preparation, and methods for using the compounds described in various applications.

BACKGROUND

The U.S. Geological Society reports that the total world rare earth element (REE) reserves are about 140 million tons, with 39% portion of these reserves controlled by China. As a result, establishing sufficient U.S. market share in REEs is necessary to avoid a negative domestic economic impact. Market analysis of rare earth metals/elements predicts a 5.3% average annual increase in the demand for these materials over the next 25 years. This increase reflects the rapidly growing need for REEs as a key raw material in applications such as magnets, battery and metal alloys, automobile catalysts, polishing materials, and the like.

Mineral formations containing REEs reserves include fluorocarbonate-based bastnasite, phosphate-based monazite, as well as pyrite and marcasite that are also found in coal. Leaching of REEs from these undisturbed and mined mineral reserves into ground, river, lake, and sea water presents unique opportunities to capture the REEs. Among the REEs, lanthanum, neodymium, and cerium are predicted to be the highest in demand. Common methods used to capture metals, including REEs, from water include flotation; solvent extraction; adsorption, accomplished using amine or carboxylate/carboxylic functionalized polymer beads or silica-supported sorbents; separation, which has been done with amine or amidoximine-functionalized electrospun polymer fiber membranes; and solvent extraction by expensive ionic liquids.

The costly equipment for electrospinning and relatively slow performance of membranes due to diffusion controlled mechanisms make these materials unattractive. Furthermore, the long preparation time for some silica-based sorbents in the literature and their relatively low stability make their large scale application difficult. Preparation of robust, functionalized silica sorbents utilizing stable covalent chemical reactions by a simple method could facilitate rapid commercialization of REES sorbents.

One or more advantages of embodiments of the invented PEI/epoxysilane/$SiO_2$ sorbents over existing sorbent materials include the fast and easy preparation procedure, the low raw material costs, recyclability, stability, and the lack of sodium, potassium, calcium, and magnesium adsorption. The absence of Na, K, Ca, and Mg affinities exhibited by the invented sorbent indicates that the sorbent will capture valuable REEs and toxic heavy metals from various $H_2O$ sources without interference from some unwanted or non-valuable ions.

SUMMARY

Embodiments of the invention relate to the novel combination of different polyamines, primarily polyethylenimine Mw=800 ($PEI_{800}$), and an expoxysilane, namely 2-(3,4-epoxycyclohexyl)ethyltrimethoxysilane (ES or ECTMS), which covalently immobilized theREE-adsorbing amine sites within low cost, porous silica particles. A stable immobilized amine sorbent, 181D, comprised of 28 wt % of $PEI_{800}$/2ES/silica (12/28/60 pre-grafting wt. ratio) retained all of its organic content after being exposed to flowing $H_2O$ and aqueous REEs solutions. Embodiments of this sorbent captured ≥95% of both, different single REEs and a mixture of REEs, including La, Y, Ce, Yb, Eu, Nd, Yb, and Pr at 5-100 ppm concentrations in $H_2O$. The high affinity of the sorbent towards REEs instead of towards Na, Ca, K, and Mg, which were not adsorbed, confirms the preference of the sorbent to adsorb the valuable metals. Moreover, stability of this sorbent after 3 adsorption-release/regeneration cycles shows promise for the application of this, and potentially other polyamine/epoxysilane/silica sorbents, to commercial processes for aqueous REE capture.

Alternative embodiments of the present invention include: (1) Incorporating different hydroxyl-containing supports, such as SBA 15, MCM-41, zeolite 13X, fumed silica, precipitated silica, silica gel, silica pellets, silica beads, hydroxylated alumina particles or pellets/beads such as those similar to gibbsite, diaspore or boehmite and iron oxide particles with surface hydroxyl groups; cellulose fibers, chunks, particles, beads, etc.; (2) Incorporating different REES and heavy metal capture species, such as (i) polyamines-polyethylenimine having a Mw ranging from about 400 to 1,000,000, ethylenediamine, diethylenetriamine, triethylenetetramine, tetraethylenepentamine, pentaethylenehexamine, hexaethyleneheptamine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N-Diphenyl-p-phenylenediamine, N,N'-Diisopropyl-1,3-propanediamine, polyvinyl amine, poly(allylamine), (ii) aminoacids-arginine, asparagine, aspartic acid, cysteine, methionine, tryptophan, histidine, lysine, glutamine, glutamic acid, and tyrosine, (iii) aminosilanes aminopropyltriethoxysilane, 3-(2-Aminoethylamino)propyldimethoxymethylsilane, Bis[3-(trimethoxysilyl)propyl]amine, N-[3-(Trimethoxysilyl)propyl]aniline, and 1-[3-(Trimethoxysilyl)propyl]urea; (3) Incorporating different silane-derived linkers, such as (3-Bromopropyl)trimethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate, 3-Glycidyloxypropyl)trimethoxysilane among other embodiments; (4) Incorporating different epoxy linkers, including 2-(3,4-epoxycyclohexyl)ethyltriethoxysilane, 5,6-epoxyhexyltriethoxysilane, tetrakis[(epoxycyclohexyl)ethyl]tetramethylcyclotetrasiloxane, epoxypropoxypropyl terminated polydimethylsiloxane, (epoxycyclohexylethyl)methylsiloxane]-dimethylsiloxane copolymer, 1,3-bis[2-(3,4-epoxycyclohexyl)ethyl]tetramethyldisiloxane, (epoxypropyl)heptaisobutyl-t8-silsesquioxane, epoxypropoxypropyl)methylsiloxane]-dimethylsiloxane, mono-(2,3-epoxy)propylether terminated polydimethylsiloxane, epoxycyclohexylethyl terminated polydimethylsiloxane.

One embodiment relates to a stable and regenerable immobilized amine sorbent. In this embodiment the amine sorbent is characterized by covalently immobilized polyamine combined with epoxysilane either as a pure polymer chunk and particle or immobilized within a silica support.

Another embodiment relates to a stable and regenerable immobilized amine sorbent. In this embodiment the amine sorbent is characterized by a porous, crosslinked polymer network consisting of polyamines combined with covalent crosslinker species.

Still another embodiment relates to a method of making a stable and regenerable immobilized amine sorbent composition. The method includes selecting an amount of different polyamines and epoxysilane; and combining the selected amounts of different polyamines with the epoxysilane, forming the sorbent.

Yet another embodiment relates to a method of using a stable and regenerable sorbent material to capture a rare earth element (REEs) from a source. The sorbent material is characterized by covalently immobilized polyamine combined with epoxysilane. Further the method includes exposing the sorbent material to the liquid source; and capturing at least one REE in the source.

Additionally embodiments relate to a method of using a stable and regenerable sorbent material to capture a rare earth element (REEs) from a source. The sorbent material is characterized by covalently immobilized polyamine combined with epoxysilane. The method includes exposing the sorbent material to the liquid source; and capturing at least one naturally occurring element in the source.

In any one or more of the embodiments described herein, the polyamine may be selected from the group consisting of: polyethylenimine (Mw=400 to 1,000,000), ethylenediamine, diethylenetriamine, triethylenetetramine, tetraethylenepentamine, pentaethylenehexamine, hexaethyleneheptamine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N'-Diphenyl-p-phenylenediamine, N,N'-Di-isopropyl-1,3-propanediamine, polyvinyl amine, poly(allylamine). Further in one or more embodiments, the epoxysilane is 2-(3,4-epoxycyclohexyl)ethyltrimethoxysilane (ECTMS).

One or more embodiments may include silica and/or aminosilane. Different amounts of silica and/or aminosilane may be combined with selected amounts of different polyamines and an epoxyssilane, where the amount of silica, aminosilane, polyamines and/or epoxysilanes is selected based on at least an amount of elements (rare earth elements (REEs) for example) to be captured. Further the aminosilane is selected from the group consisting of 3-aminopropyltrimethoxysilane, N-(3-trimethoxysilyl) propyl)ethylenediamine, and N-(3 Trimethoxysilylpropyl)diethylenetriamine (TMPDET).

Embodiments may include a porous polymer network, where the porous polymer network is an amine-epoxy monolith. Embodiments further may include a crosslinker where the crosslinker is a polyepoxide selected from the group consisting of: di-epoxide as in bisphenyl A diglycidyl ether, tri-epoxide as in N—N-diglycidyl-4-glycidyloxyanaline, and tetra-epoxide as in 4,4'-methylenebis(N,N-diglycidylaniline). The monolith may be immobilized within silica.

One or more embodiments may include a porous polymer network, where the porous polymer network is an acrylamide-based hydrogel. The acrylamide hydrogel may be an organic acrylamide hydrogel, containing no silica particles; an organic-inorganic hybrid acrylamide hydrogel, containing silica particles within the polymer network and also serving as a support that contains the hydrogel. Further, the acrylamide hydrogel may be synthesized by thermo-polymerization of acrylamide onto PEI polymer chain with N,N'-methylene bisacrylamide.

Different embodiments may include REEs-adsorbing sites within low cost silica particles. Embodiments may include regenerating the sorbent material. Embodiments may include pre-concentrating the at least one REE to ppm levels and the REEs may be selected from the group consisting of La, Ce, Nd, Eu, Pr, Y, Dy and Yb, plus Sc and the remaining series of the lanthanide metals (REEs; Pm, Sm, Gd, Tb, Ho, Er, Tm, and Lu).

Embodiments may include selectively releasing critical metals from the source (a liquid source such as acid mine drainage or water from hydraulic fracturing for example). Heavy metals may be captured where the heavy metals is selected from the group consisting of Pb, Cu, Zn, Fe, Al, Mn, Ni, Mg, La, Ce, Nd, Eu, Pr, Y, Dy and Yb, plus Sc and the remaining series of the lanthanide metals (REEs; Pm, Sm, Gd, Tb, Ho, Er, Tm, and Lu.

Embodiments may include a naturally occurring element, where the element is barium and/or strontium. Barium may be selected from the group consisting of: Strontium may be selected from the group consisting of:

The following U.S. Patent Applications are incorporated herein by reference in their entirety:
1. U.S. Patent Application No. 2010/0147770 A1 to Fryxell et al.
2. U.S. Patent Application No. 2014/0206532 A1 to Janke et al.
3. U.S. Patent Application No. 2011/0083684 A1 to Luan et al.
4. U.S. Patent Application No. 2013/0287662 A1 to Chuang.

The following articles are each incorporated herein by reference in their entirety:
1. Simandl, G. J., *Geology and market-dependent significance of rare earth element resources.* Mineralium Deposita, 2014. 49(8): p. 889-904.
2. Alonso, E., et al., *Evaluating Rare Earth Element Availability: A Case with Revolutionary Demand from Clean Technologies.* Environmental Science & Technology, 2012. 46(6): p. 3406-3414.
3. Noack, C. W., D. A. Dzombak, and A. K. Karamalidis, *Rare Earth Element Distributions and Trends in Natural Waters with a Focus on Groundwater.* Environmental Science & Technology, 2014. 48(8): p. 4317-4326.
4. Sun, X., H. Luo, and S. Dai, *Mechanistic investigation of solvent extraction based on anion-functionalized ionic* liquids for selective separation of rare-earth ions. Dalton Transactions, 2013. 42(23): p. 8270-8275.
5. Hatje, V., K. W. Bruland, and A. R. Flegal, *Determination of rare earth elements after pre-concentration using NOBIAS-chelate PA-1®resin: Method development and application in the San Francisco Bayplume*. Marine Chemistry, 2014. 160(0): p. 34-41.
6. Özero?lu, C. and G. Keçeli, *Removal of strontium ions by a crosslinked copolymer containing methacrylic acid functional groups</p></p>*. Journal of Radioanalytical and Nuclear Chemistry, 2006. 268(2): p. 211-219.
7. Gao, Y., et al., *Adsorption of La3+ and Ce3+ by poly-γ-glutamic acid crosslinked with polyvinyl alcohol*. Journal of Rare Earths, 2015. 33(8): p. 884-891.
8. Florek, J., et al., *Selective recovery of rare earth elements using chelating ligands grafted on mesoporous surfaces*. RSC Advances, 2015. 5(126): p. 103782-103789.
9. Florek, J., et al., *Nanostructured hybrid materials for the selective recovery and enrichment of rare earth elements*. Advanced Functional Materials, 2014. 24(18): p. 2668-2676.
10. Aguado, J., et al., *Aqueous heavy metals removal by adsorption on amine-functionalized mesoporous silica*. Journal of Hazardous Materials, 2009. 163(1): p. 213-221.
11. Ghoul, M., M. Bacquet, and M. Morcellet, *Uptake of heavy metals from synthetic aqueous solutions using modified PEI—silica gels*. Water Research, 2003. 37(4): p. 729-734.
12. Hong, G., et al., *Nanofibrous polydopamine complex membranes for adsorption of Lanthanum (III) ions*. Chemical Engineering Journal, 2014. 244(0): p. 307-316.
13. Song, Y., et al., *Polyamidoxime/Poly(vinyl alcohol) Composite Chelating Fiber Prepared by Emulsion Spinning and Its Adsorption Properties for Metal Ions*. Industrial & Engineering Chemistry Research, 2015. 54(49): p. 12367-12373.
14. Wilfong, W. C., B. W. Kail, and M. L. Gray, *Rapid Screening of Immobilized Amine CO2 Sorbents for Steam Stability by Their Direct Contact with Liquid H2 O*. ChemSusChem, 2015. 8(12): p. 2041-5.
15. Shannon, R. t., *Revised effective ionic radii and systematic studies of interatomic distances in halides and chalcogenides*. Acta Crystallographica Section A: Crystal Physics, Diffraction, Theoretical and General Crystallography, 1976. 32(5): p. 751-767.
16. Isenberg, M. and S. S. C. Chuang, *The Nature of Adsorbed CO2 and Amine Sites on the Immobilized Amine Sorbents Regenerated by Industrial Boiler Steam*. Industrial & Engineering Chemistry Research, 2013. 52(35): p. 12530-12539.
17. Silva M, E., S. Chakravartula S, and S. C. Chuang, *Silica-Supported Amine Catalysts for Carbon-Carbon Addition Reactions*. Topics in Catalysis, 2012. 55(7-10): p. 580-586.
18. Wilfong, W. C.; Kail, B. W.; Bank, T. L.; Howard, B. H.; Gray, M. L., Recovering *Rare Earth Elements rom Aqueous Solution with Porous Amine-Epoxy Networks*. ACS App. Mater. Interfaces 2017, 9, 18283-18294.
19. Wang, Q.: Wilfong, W. C.; Kail, B. W.; Yu, Y; Gray, M. L., *Novel Polyethylenimine-Acrylamide/$SiO_2$ Hybrid Hydrogel Sorbent for Rare-Earth-Element Recycling From Aqueous Source*. ACS Sustainable Chem. Eng.
20. Wang, Q., et al., *Novel Polyethylenimine-Acrylamide/$SiO_2$ Hybrid Hydrogel Sorbent for Rare Earth Elements Recycling from Aqueous Sources*. ACS Sustainable Chemistry & Engineering, 2017.
21. Silva, L. F. O., M. Wollenschlager, and M. L. S. Oliveira, *A preliminary study of coal mining drainage and environmental health in the Santa Catarina region, Brazil*. Environmental Geochemistry and Health, 2011. 33(1): p. 55-65.
22. Zhao, F., et al., *The geochemistry of rare earth elements (REE) in acid mine drainage from the Sitai coal mine, Shanxi Province, North China*. International Journal of Coal Geology, 2007. 70(1-3): p. 184-192.
23. U.S. EPA (U.S. Environmental Protection Agency). 2016. Hydraulic Fracturing for Oil and Gas: Impacts from the Hydraulic Fracturing Water Cycle on Drinking Water Resources in the United States. Office of Research and Development, Washington, D.C. EPA/600/R-16/236Fa.

BRIEF DESCRIPTION OF THE DRAWINGS

These and other features, aspects, and advantages of the multiple embodiments of the present invention will become better understood with reference to the following description, appended claims, and accompanied drawings where:

FIG. 6A depicts a graph illustrating REE capture by silica-supported 100 μm, 14.9 wt % $PEI_{800}$-Aam-MBAA/$SiO_2$ (3-3-1/10 by wt.) plus 13.9% 100 μm, $PEI_{800}$-MBAA/$SiO_2$ (4-1.5/10) sorbent, while FIG. 6B depicts REE capture by 100 μm, 40% E3-$PEI_{800}$/$SiO_2$ (1.6-2.4/6) sorbent from a pH=5.5, equimolar La, Nd, Eu, Dy, and Yb solution with a total $Ln^{3+}$ concentration of 0.72 mM (100-120 ppm).

FIG. 13A depicts the average 3-cycle uptake of alkali/alkaline metals, heavy metals, and REEs from synthetic acid mine drainage solutions, while FIG. 13B depicts a graph illustrating sequential and total release of metals from the sorbent during cycle testing.

DETAILED DESCRIPTION

Figure 1:
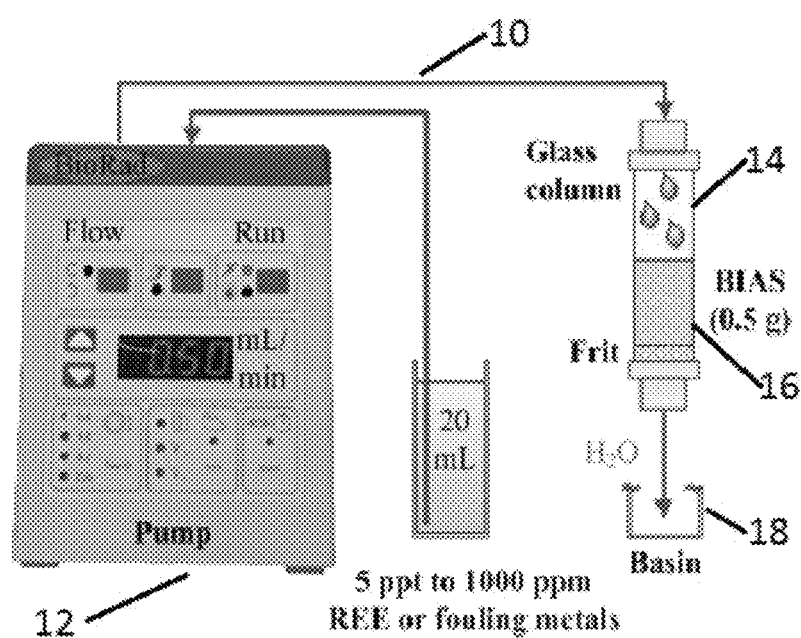
FIG. 1 depicts an exemplary system for adsorbing dissolved REEs and/or fouling materials (such as heavy metals) from sources such as flowing liquid environments.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of amorphous, organic-functionalized sorbent materials, methods of their preparation, and methods for using such materials.

Embodiments relate to the synthesis of basic immobilized amine sorbents (BIAS) containing a polyethylenimine (PEI) species covalently attached to a silica surface via a reactive epoxysilane linker. The covalent and $H_2O$-stable PEI-epoxysilane-silica species should resist degradation and leaching by $H_2O$ in an aqueous system containing rare earth elements (REEs) and heavy metals, which are captured by PEI's amine functional groups (—$NH_2$, —NH, —N).

An array of basic immobilized amine sorbents (BIAS) was prepared by dissolving 4.0 g amounts of a combination of a polyamine, 2-(3,4-epoxycyclohexyl)ethyltrimethoxysilane (epoxysilane, ECTMS) or Mono-(2,3-epoxy) propyl-ether terminated polydimethylsiloxane such as MCR-E11 PDMS (Gelest), and an aminosilane in 100.0 mL of methanol (99.8%, Sigma-Aldrich). Polyamines included polyethylenimine Mw=800 ($PEI_{800}$, Sigma-Aldrich), triethylenetetramine (TETA, Sigma-Aldrich), diethylenetriamine (DETA, Sigma-Aldrich), and ethyleneimine E100 (E100, Huntsman); aminosilanes included 3-aminopropyltrimethoxysilane (APTMS, Sigma-Aldrich), N-(3-trimethoxysilyl) propyl)ethylenediamine (TMPED), and N-(3-Trimethoxysilylpropyl)diethylenetriamine (TMPDET). These solutions containing different ratios of polyamine/aminosilane/epoxysilane were added to 6.0 g of amorphous silica (80 and 100 μm, PQ CS 2129, PQ Corp.) in a 500 mL round-bottom flask, which was placed in a rotary-evaporator and heated at 80° C. while gradually pulling a vacuum of 200 to 900 mbar (absolute pressure of 800 mbar to 100 mbar) for 60 min to evaporate methanol. Once dried, sorbents containing epoxysilane were further heated in the rotary-evaporator at 90° C. for 60 to 90 min under atmospheric pressure to react the epoxysilane with the amine groups of the polyamines or aminosilanes. The resulting sorbents were about 80 μm-sized particles and were comprised of about 25 to 50 wt % as the impregnated species.

Initial screening of the BIAS sorbents for their stability in a flowing liquid environment was accomplished using the published accelerated $H_2O$ method, which involved contacting 0.5 g of BAIS with 0.5 mL/min of flowing $H_2O$ for 40 min. Because REE capture of the sorbents occurs in flowing aqueous systems, the incorporated REE capture species (amines and others) must resist leaching from the sorbent and also resist rearrangement or agglomeration within the pores, all of which could degrade the REE and heavy metal capture capacity of the sorbent. To assess the leach resistance of the sorbents' organic species, the organic content of the fresh and accelerated $H_2O$ treated sorbents were determined by heating the sorbents at 105° C. in $N_2$ for 60 min to desorb $H_2O$ and $CO_2$ pre-adsorbed from ambient, followed by heating up to 1200° C. in air and measuring the weight loss. Organic content retained (OCR) values were calculated by dividing the organic content of the $H_2O$-treated sorbent by that of the fresh sorbent and multiplying by 100. Higher OCR values corresponded to sorbents that would be more stable in liquid REES and heavy metal capture processes. For additional assessment of sorbent stability, $CO_2$ capture capacities of the fresh and $H_2O$-treated sorbents were determined by flowing 60 mL/min of 85% $CO_2$ over pre-treated sorbents (105° C., $N_2$, 60 min) at 60° C. for 60 min. Percentage of $CO_2$ capture retained (PCR) values were calculated by dividing the $CO_2$ capture of the $H_2O$-treated sorbent by that of the fresh sorbent and multiplying by 100. PCR values were used to assess the $H_2O$ stability of BIAS sorbents to flowing liquid $H_2O$, and also $H_2O$ vapor. Importantly, higher PCR values correspond to sorbents that both retained more of their organic (amine) species after accelerated $H_2O$-treatment, and resisted rearrangement and agglomeration within the pores. Collectively, sorbents exhibiting the highest accelerated $H_2O$ OCR and PCR values were the most promising for REES or heavy metal capture from the flowing aqueous REE solutions.

The adsorption of REE species by stable BIAS sorbents from flowing aqueous solutions was accomplished using a similar set-up (see FIG. 1 for example) as that for the accelerated $H_2O$, where the BIAS was directly contacted for 40 min by a 0.5 mL/min flow of REE solution, containing 5 to 100 ppm of either a single REE element of La, Nd, Eu, Dy, Yb, Ce, Pr, or Y, in deionized $H_2O$ or a mixture of these elements in $H_2O$. These REEs represent the varying sizes and electronic structures of all REEs and are among those with the highest market demand. Tests using this same set-up but with REE concentrations as low as 5 ppt (for testing simulated seawater) and as high as 700 to 1000 ppm were also performed.

To remove the metals, the BIAS with adsorbed REE underwent an acid treatment. The acid treatment involved contacting the spent material for 40 min with 0.5 mL/min flows of different concentrations of aqueous acetic acid solutions, from 0.01 to 50 wt % acid. Acetic acid acted as a stronger acid than the adsorbed metals, allowing the metals to be removed from the adsorption sites, where sites here refers to amine groups. For cyclic stability testing, the acid treated BIAS were additionally treated with 2.1 wt % of NaOH. NaOH is a stronger base than the metal adsorption sites (amines), and therefore removes the acetic acid and regenerates, in part, the amines. A total of 3 cycles were performed that consisted of the adsorption, acid treatment, and base treatment steps.

Concentrations of REEs in all solutions were measured using a Nexion 300D ICP-MS (Perkin Elmer). Data was collected in kinetic energy discrimination (KED) mode using 2-4 ml/min He as the collision gas. Indium was used as an internal standard. A calibration curve was constructed, relating known concentrations of different REEs in DI $H_2O$ to the ICP-MS response intensity. This curve was used to calculate the REE concentration in the solutions.

Table 1 illustrates the compositions, and both the PCR and OCR values of some sorbents screened via accelerated $H_2O$ testing for their application in REE and heavy metal capture. Overall, all sorbents containing the ECTMS epoxysilane displayed high PCR values between 45 and 81%, and more importantly high OCR values between 60 and 102%.

TABLE 1

Pre-reacted composition and accelerated H$_2$O screening of potential BIAS sorbents for REE capture. Note, TGA burns revealed a 28 wt % post-reaction/grafting organic loading for 181D

| Sorbent | Pre-reacted Organic content | Polyamine/Aminosilane/ Epoxysilane ratio | CO$_2$ ads, fresh (mmol CO$_2$/g) | PCR (%) | OCR (%) |
|---|---|---|---|---|---|
| 71 | 39 | PEI$_{800}$ only | 2.8 | ~22 | 11.6 |
| NETL32D (500 µm) | 40 | PEI$_{800}$/TMPED-12/28 | 2.1 | 42.9 | 44.5 |
| NETL32D (80 µm) | 40 | PEI$_{800}$/TMPED-12/28 | 1.7 | 32.0 | |
| NETL009A | 40.7 | TETA/TMPED/ECTMS- | 1.8 | 45.8 | 60.1 |
| NETL009B | 50.6 | PEI$_{800}$/TMPED/ECTMS- | 1.4 | 69.8 | 73.5 |
| NETL009D | 51.0 | TETA/TMPED/ECTMS- | 1.8 | 47.2 | 57.2 |
| NETL004A | 40.6 | PEI$_{800}$/TMPDET/ECTMS- | 1.5 | 56.3 | |
| NETL009C | 40.8 | PEI$_{800}$/APTMS/ECTMS- | 1.3 | 62.7 | 65.5 |
| NETL181A | 38.7 | PEI$_{800}$/TMPED/ECTMS- | 1.2 | 76.7 | 77.3 |
| NETL181B | 41.3 | PEI$_{800}$/TMPED/ECTMS- | 1.6 | 60.1 | 53.4 |
| NETL181C | 40.8 | PEI$_{800}$/TMPED/ECMTS- | 1.1 | 63.7 | 79.9 |
| NETL181D | 40.7 | PEI$_{800}$/ECTMS-12/28 | 0.8 | 81.3 | 102.5 |
| NETL002A | 40.9 | E100/ECTMS-12/28 | 0.5 | 74.5 | |
| NETL002B | 40.5 | TEPA/ECTMS-12/28 | 0.9 | 64.0 | |
| NETL002C | 40.9 | DETA/ECTMS-12/28 | 0.8 | 72.2 | |

These PCR and OCR values are significantly higher than those for sorbents 71 (only PEI) and 32D (PEI and TMEPD), both of which don't contain epoxysilane. This data confirms the superior stability of the sorbents containing a mixture of various polyamines and epoxysilane, in which the sorbents' stabilities are attributed to covalent grafting of the epoxysilane to the silica surface, and covalent attachment of PEI to the grafted epoxysilane. Critically, because these sorbents will be used in a flowing liquid REES or heavy metal set-up, it is imperative that nearly all of the organic content be retained after accelerated H$_2$O testing. Therefore sorbent 181D, with an OCR of 102.5%, is an exemplary candidate for REE recovery testing. The greater than 100% OCR for this sorbent could result from retention of strongly adsorbed H$_2$O despite pretreatment before burning the sorbent in air. Furthermore, this sorbent had the highest PCR value, 81.3%, of all sorbents. This PCR value, in addition to the OCR value, indicates that covalently bound PEI exhibits the most stable network of amine sites for adsorbing CO$_2$, but more importantly for capturing REEs or heavy metals.

FIG. 1 depicts an exemplary system 10 for adsorbing contaminants such as REEs and/or fouling materials such as heavy metals, barium, strontium and the like. The illustrated system 10 includes a contaminant source 12, an adsorption site 14 containing a sorbent 16 and a basin or reservoir 18 as more fully described herein. The source 12 containing the contaminant (REEs and/or fouling material) contacts the sorbent 16 in the adsorption site 14. The remaining liquid is collected in reservoir 14 such that the REEs and/or fouling materials are captured.

Figure 2:
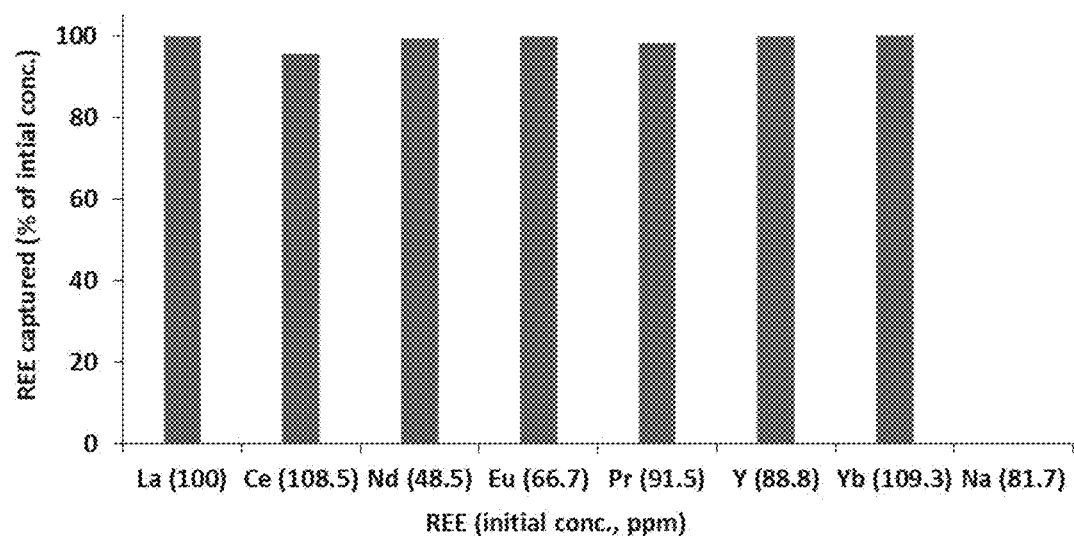
FIG. 2 depicts a graph illustrating REE adsorption by 0.5 g of sorbent 181D from 20 mL of stock solutions containing 48 to 109 ppm of each of pure La, Ce, Nd, Eu, Pr, Y, Yb metal and Na.

The amount of adsorbed metals was quantified by measuring the metal concentrations in both the fresh stock solutions and the effluent solutions exiting the glass column via ICP-MS. FIG. 2 shows the percentage of various REEs captured from 20 mL of different pure stock solutions after flowing each through separate 181D sorbent beds.

FIG. 2 depicts the REE adsorption by 0.5 g of sorbent 181D from 20 mL of stock solutions containing 48 to 109 ppm of each of pure La, Ce, Nd, Eu, Pr, Y, and Yb metal. Values in parenthesis on the REE-axis show the concentration of each REE in units of ppm. The relative standard deviation for the concentration measurements is less than 2%.

The results illustrate that 181D was highly efficient in capturing various pure REES from a flowing aqueous source, with between 95 and 99.9% of the initial solution REEs removed by the sorbent. Additional solutions of 50, 10, and 5 ppm aqueous La were also flowed through the 181D sorbent bed to assess the sorbent's sensitivity to REES at lower concentrations. Respective La removals of 94.5, 99.9, and 99.7% from the 50, 10, and 5 ppm solutions further highlight the affinity of the sorbent for even small amounts of REEs. Furthermore, Na is an abundant metal species found in many water supplies and could interact with the amines and interfere with the adsorption of REEs. Therefore, an about 82 ppm aqueous Na solution was tested for metal adsorption by 181D. The 0% Na removal by the sorbent indicates that the presence of Na in aqueous systems won't negatively affect the removal of the valuable REEs.

Figure 3:
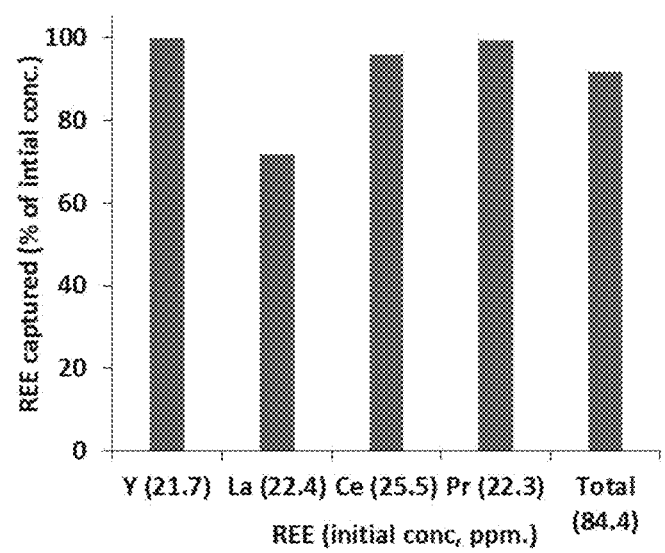
FIG. 3 depicts a graph illustrating REE adsorption by 0.5 g of sorbent 181D from 20 mL of a stock solution containing Y, La, Ce, and Pr.

To investigate potential selectivity of the 181D sorbent to different REEs, an 84 ppm stock solution was prepared with 21-25 ppm each of Y, La, Ce, and Pr and was tested. FIG. 3 reveals that 181D captured 99.9% of Y, 71.7% of La, 95.9% of Ce, and 99.3% of Pr, providing an overall total capture of 93.6% of the initial REE concentration. The sorbent showed lower selectivity for La compared to the other REEs in the mixture, suggesting that the sorbent favored adsorption of metals with smaller atomic radii given the same coordination number; La=1.03 Å (3+), Ce=1.01 Å (3+) or 0.87 Å (4+), Y=0.90 Å (3+), Pr=0.99 Å (3+) or 0.85 Å (4+) where the number in parenthesis is the oxidation state of the metal ion, and the coordination number of the metals was taken as IV. However it is expected that varied coordination numbers among the REEs, and other factors besides those involving the ionic radii, more strongly dictated the REE adsorption behavior of the sorbent.

It is believed that the adsorption of REEs by the immobilized amine sorbents occurred through the formation of an organic-metal complex, involving metal cations and, primarily, lone electron pairs of the immobilized amine groups (—N/—NH/—NH$_2$). Complexation of other metals by similar amine species have been reported elsewhere. Because recyclability of sorbents, namely here 181D, is necessary for their practical application, step 1 of 2 in regenerating the metal adsorption sites, i.e. amine groups, is the release of the adsorbed metal. In exemplary embodiments are adapted to remove adsorbed metals, the organic-metal complex is contacted with a dilute Bronstead acid. The Bronstead acid protonates the amine and/or organic complexes and therefore disassociates the adsorbed metal, breaking the amine-metal complexes and forming ammonium ions.

To test the removal of an adsorbed representative REE (La in this embodiment) from the 181D sorbent, 20 mL of a stock 80-100 ppm La solution were flowed through separate beds of 181D for La adsorption, and then 20 mL of separate 0.01, 1, 5, and 10 wt % aqueous acetic acid solutions were flowed to induce the release of La from the amines.

TABLE 2

Effect of acetic acid concentration on La release from 181D

| Wt % acetic acid (AA) | La concentration in AA wash solution (ppm) | % La released |
|---|---|---|
| 0.01 | 2.5 | 2.5 |
| 1 | 79 | 95 |
| 5 | 81 | 98 |
| 10 | 81 | 98 |

The results in Table 2 demonstrate that nearly all adsorbed La was removed with a 1 to 5 wt % acetic acid solution. This concentration is similar to the 5-8% range for food grade table vinegar and indicates that environmentally friendly and halogen-free reagents may be used in this process.

Figure 4:
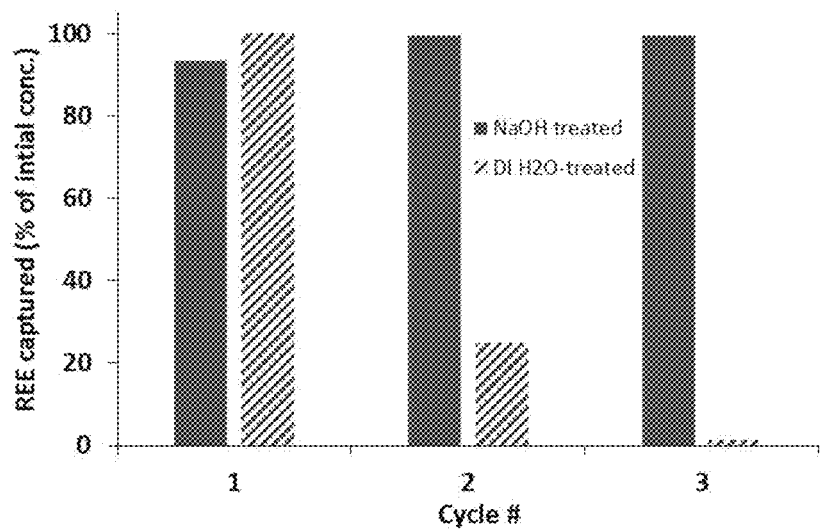
FIG. 4 depicts a graph illustrating the results of La adsorption-desorption cycling on 181D.

To complete the full cycle of REE capture and sorbent regeneration, step 2 involves treating the newly protonated-amine sorbent from step 1 with a base, such as NaOH, to regenerate the amines. To assess the cyclic stability of 181D, three cycles of La adsorption-release/regeneration were performed by, (i) flowing 20 mL of the 100 ppm La solution, (ii) flowing 20 mL of 1 wt % acetic acid solution, (iii) and then flowing 20 mL of 2.1 wt % NaOH solution. Steps (i)-(iii) were repeated two more times, totaling the three cycles. Results of the La cycling test, shown in FIG. 4, reveal that the sorbent maintained a high La adsorption capacity of between 93.5 and 99.5% of the solution's initial La concentration when NaOH solution was used to regenerate the amines step 2.

In contrast, a decreasing La adsorption capacity for the sorbent with increasing cycle number was observed when only DI water was used for regeneration. These results support the hypothesis that the NaOH base treatment deprotonated the ammonium ions previously generated in the acetic acid REE release step, converting the ammonium species back into the amines that can adsorb REE in the following cycle.

To determine the 181D sorbent's relative maximum REE capture capacity for the representative REE, La, 0.5 g of 181D was both, (i) mixed with 20 mL of a 464 ppm La solution and stirred for 1 hr, and (ii) placed in the flow system for standard REE adsorption. Results of both tests showed a similar maximum uptake of 0.9 to 1.0 wt % REE capture, meaning that the 0.5 g of sorbent captured about 5.0 mg of REE total.

The chemical structure of the 181D sorbent was examined by diffuse reflectance infrared Fourier transform spectroscopy (DRIFTS) to confirm the covalent attachment of PEI to the silica surface by the epoxysilane (ES) linker. The spectra of silica, 12 wt % ECTMS (referred to as ES)/silica, and 13 wt % PEI/silica were included as references to better explain the nature of 181D.

Figures 5A, 5B:
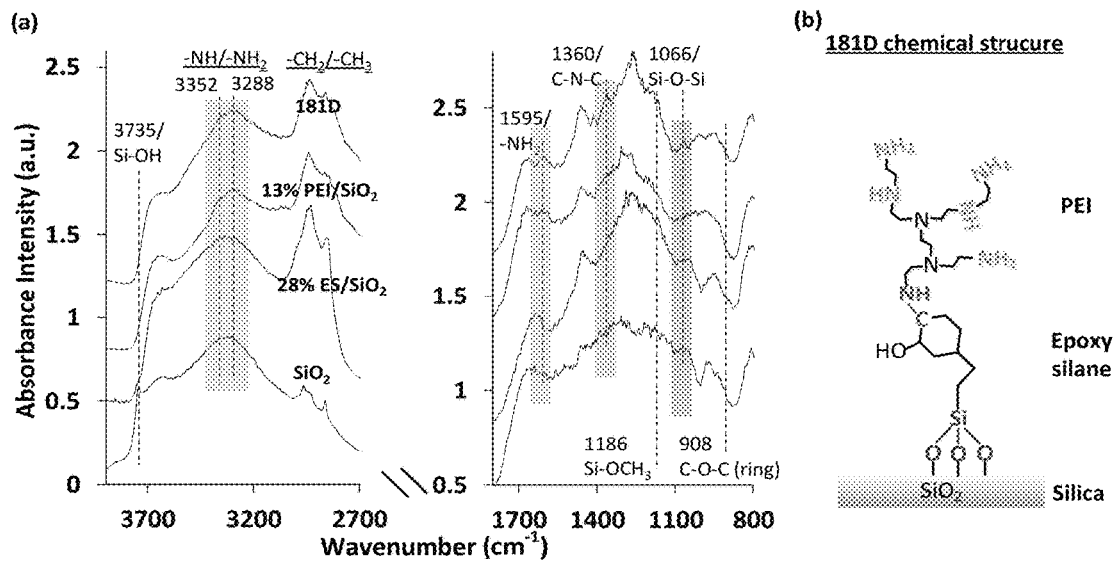
FIG. 5A depicts DRIFTS absorbance spectrum of the 181D sorbent as well spectra of 13 wt % $PEI_{800}$/silica, 28 wt % epoxysilane/silica, and pure silica as references, while FIG. 5B Schematic of 181D chemical structure.

The DRIFTS absorbance spectrum of silica in FIG. 5A reveals silica's Si—OH stretching band for free or geminal hydroxyl groups at 3735 $cm^{-1}$, which may serve as grafting sites to anchor the epoxysilane. The spectrum of ES/silica in (a) shows a small shoulder band at 908 $cm^{-1}$ for the C—O—C vibration of the epoxy ring that can react with the amines of PEI. Because the ES/silica sorbent was not heated at 90° C. for 1 hr to induce the ES-to-silica grafting reaction after initial sorbent drying, the features of the strong intensity band at 1186 $cm^{-1}$ largely represent unreacted Si—$OCH_3$ (methoxy) groups that are available react with the silica hydroxyl groups when preparing the 181D sorbent. The spectrum of PEI/silica in (a) reveals the characteristic N—H vibrations (yellow) of PEI at 3352 and 3288 $cm^{-1}$ (stretching) and 1595 $cm^{-1}$ (bending), and also a broad band centered at about 1360 $cm^{-1}$ for a C—N vibration (blue).

The spectrum of the 181D sorbent shows a reduced 3735 $cm^{-1}$ Si—OH band intensity relative to that of silica, along with the formation of small but noticeable Si—O—Si peak at 1066 $cm^{-1}$ (red), which is in contrast to the flat intensity of this band presented in the reference silica, ES/silica, and PEI/silica spectra. These IR features confirm the grafting reaction between the ES methoxy groups and the silica hydroxyl groups, which produced the epoxysilane-silica species. The sharpened and increased intensity of the C—N—C band at 1360 $cm^{-1}$ (blue) compared to the broad features of this band in the spectrum of PEI/silica indicates the reaction between the PEI-$NH_2$ groups and the ES epoxy groups, which ultimately formed the covalently attached PEI-ES-silica species as shown in FIG. 5B. The stability of these covalently attached species was evidenced by the 100% PCR value of the 181D after accelerated $H_2O$ testing and by the consistently high REE capture capacity of this sorbent during multiple cycles of REE adsorption-desorption.

Easily prepared immobilized amine sorbents that contain polyamines, epoxysilane, and silica are structurally stable; capture a variety of REE from flowing aqueous streams with low REE concentrations; and are recyclable over multiple cycles. These low cost, scale-able, and robust materials show promise for commercial scale processes involving REE capture from flowing aqueous streams or stagnant aqueous environments.

The novel combination of different polyamines, primarily polyethylenimine Mw=800 ($PEI_{800}$), and an epoxysilane, namely 2-(3,4-epoxycyclohexyl)ethyltrimethoxysilane (ECTMS), covalently immobilized the REE-adsorbing amine sites within low cost, porous silica particles. A stable immobilized amine sorbent, 181D, comprised of 28 wt % organics (pre-reaction$PEI_{800}$/ECTMS/silica ratio of 12/28/60) retained all of its organic content after being exposed to flowing $H_2O$ and aqueous REE solutions. This sorbent captured ≥95% of both, different single REEs and a mixture of REEs, including La, Y, Ce, Yb, Eu, Nd, and Pr at 5-100 ppm concentrations in $H_2O$. The high affinity of the sorbent towards REE instead of towards Na, which was not adsorbed, confirms the preference of the sorbent to adsorb the valuable metals. Moreover, stability of this sorbent after 3 adsorption-release/regeneration cycles are suitable for the application of this, and potentially other polyamine/epoxysilane/silica sorbents, to commercial processes for aqueous REE capture.

Figures 6A, 6B:
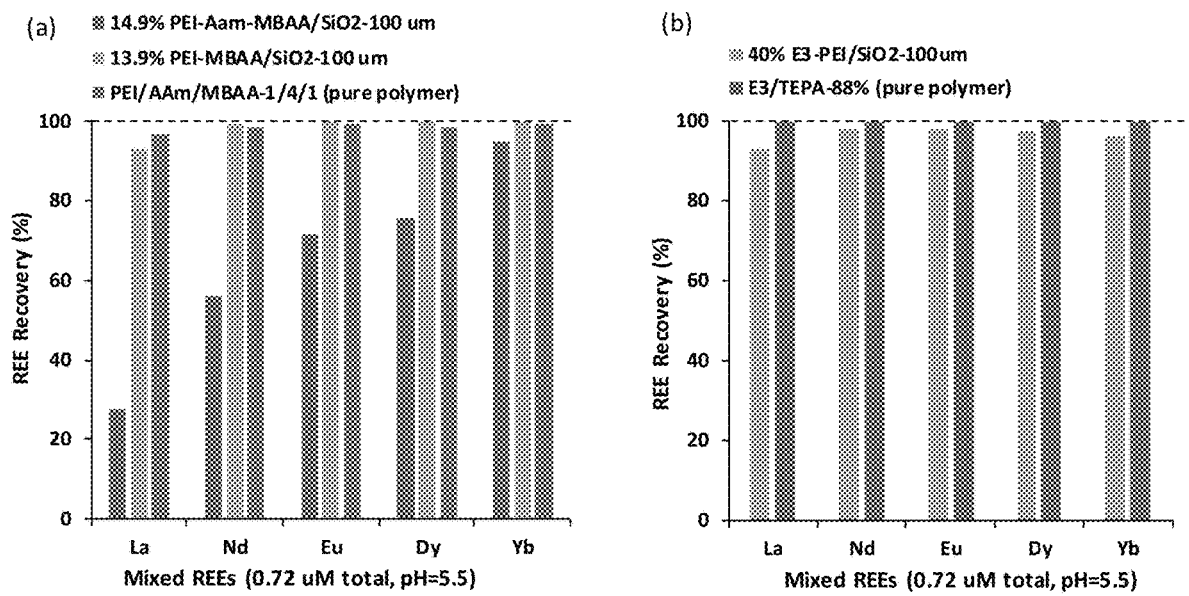

In another embodiment of the particle sorbent, the PEI800 is combined with a non-silane polyepoxide, specifically N—N-diglycidyl-4-glycidyloxyaniline (Sigma Aldrich, tri-epoxide, E3) and all functionalized on 100 μm or 500 μm silica (CS 2129, PQ Corporation). The optimum sorbent, labeled as 40% E3-PET/SiO$_2$-100 µm, contained 16 wt % E3 and 24 wt % PEI800 immobilized on 100 µm particle size silica (60 wt %), and has a PCR value of 81% plus an OCR value of 107% after accelerated H2O testing. In yet another embodiment of the particle sorbent, the PEI800 was combined with acrylamide-based crosslinkers, specifically acrylamide and N,N'-Methylenebis(acrylamide). The optimum sorbents, labeled 14.9% PEI-Aam-MBAA/SiO$_2$-100 µm and 13.9% PEI-MBAA/SiO$_2$ 100 µm, contained 13-15 wt % immobilized organics on 100 µm particle size silica, and had OCR values between 99 and 103% after accelerated H$_2$O testing. FIGS. 6A-6B illustrates the mixed-element REE uptake results for PEI-E3 and PEI-Aam-MBAA formulations functionalized on 100 µm silica (SiO$_2$) particles, and the results for the best related pure polymer counterparts. The silica-supported materials tested were (a) 100 µm 14.9 wt % PEI$_{800}$-Aam-MBAA/SiO$_2$ (3-3-1/10 by wt) plus 13.9% 100 µm PEI800-MBAA/SiO$_2$ (4-1.5/10) (silica-immobilized hydrogel), and (b) 100 µm 40% E3-PEI$_{800}$/SiO$_2$ (1.6-2.4/6) (silica-immobilized monolith-based). Pure polymers tested were PEI/Aam/MBAA-(1/4/1) (hydrogel polymer) and E3/TEPA-88 (monolith polymer), where TEPA is tetraethylenepentamine and 88 represents 88% theoretical reaction of TEPA's amine sites with the epoxides. PEI, which contains primary and secondary amines (plus tertiary amines) was used instead of TEPA in the silica-supported monolith-based sorbent due to its branched structure and higher viscosity. Both these features make PEI more leach-resistant than TEPA, which is necessary to make a stable REE sorbent. REE adsorption was performed in batch mode by soaking 0.5 g of each sorbent for 40 min in 20 mL of 0.72 mM REE solution containing equimolar amounts of La, Nd, Eu, Dy, and Yb at pH=5.5 similarly as the 181D sorbent with epoxysilane. The particles were then filtered and the treated solutions were collected for ICP analysis. The results showed that the supported materials were nearly as good as or better than the pure polymer materials, which exhibited a wide range of particles sizes (micron to millimeter sizes) and were comparable to 181D. REE capture by the SiO$_2$-supported sorbents was between 93 and 99.9% for each metal, which proves that these metals are suitable for REE recovery in practical systems.

General Materials Synthesis

In at least one embodiment relating to the general preparation of the particle sorbent, 100 ml of methanol and 1.32 g of different polyamines were added to a 250 mL beaker and stirred for 2 minutes with a glass rod to dissolve. Next, 2.88 g of [2-(3,4-Epoxycyclohexyl)ethyl]trimethoxysilane (ECTMS) was added and the mixture was stirred again for 2 minutes. The ECTMS/amine mixture was added to a 500 ml round bottom flask containing 6.0 grams of PQ2129 amorphous silica (D$_{P,avg.}$=80, 100 or 500 µm), glass fibers or fiberglass matting, beads, and pellets placed on a heated rotary-evaporator (roto-vap) at 80° C. and at 200 mbar vacuum (absolute pressure=800 mbar) for 15 minutes at 200 RPM rotational speed. The roto-vap was operated using a stepwise pressure decline of 200 mbar per 15 minutes at 80° C. for 1 hour. The materials were allowed to react further by maintaining 800 mbar final pressure (200 mbar vacuum) at 90° C. for one additional hour. It is expected that the polyamine species reacted with the epoxy group of the ECTMS, effectively attaching the polyamine to the support via the epoxysilane linker. The resultant material was weighed and then placed in a glass jar with a Teflon lined cap until it was ready to be further analyzed for total organic content, water stability and elemental analysis by CHNSO or used for metal uptake experiments. A further embodiment of the polyamine/epoxysilane sorbent includes synthesizing a pure polymer material, which is not immobilized on silica particles. Generally, this un-supported polymer sorbent is prepared by dissolving between 1.0 to 3.0 g of PEI800 and 1.0 to 4.0 g of ECTMS in about 7 mL of MeOH within a closed vial, and reacting the mixture at either 25° C. for 2 days or at 80° C. for 4 hrs.

In another embodiment of the particle sorbent, the PEI800 is combined with a non-silane polyepoxide, specifically N—N-diglycidyl-4-glycidyloxyaniline (Sigma Aldrich, tri-epoxide, E3), and all functionalized on 100 µm or 500 µm silica (CS 2129, PQ Corporation). An array of these poly-epoxide-based BIAS sorbents was prepared in the roto-vap using a similar procedure as that for the epoxysilane-based 181D. The PEI/polyepoxide/MeOH (4.0-5.0 g PEI+polyepoxide) impregnation solution was mixed with 5.0-6.0 g of silica (100 µm or 500 µm, PQ CS 2129, PQ Corp.) in a 250 mL round-bottom flask, which was placed in a rotary-evaporator and heated at 40° C. while rotating at 100 rpm and sequentially pulling a vacuum of 200 to 900 mbar for 60 min to evaporate methanol. Once visually dried, the sorbents were further heated in an oven at 105° C. for 15 min to remove any remaining solvent. Next, they were sealed in a vial to minimize air exposure (avoid amine oxidation) and were heated for an additional 45 min to complete the amine-epoxide reactions. Final organic contents of the E3-based sorbents ranged from 30 to 50 wt %, with 1.7 to 30 wt % E3 to give E3/PEI800 ratios between 0.04 and 1.50. A PCR value of 81 and an OCR value of 107.5% after accelerated H$_2$O testing revealed that the optimum sorbent contained 16 wt % E3 and 24 wt % PEI800 immobilized on 100 µm particle size silica (60 wt %). The corresponding 500 µm size sorbent was also stable, having an OCR of 94.5%. Alternative epoxides that may be used include the following: monoepoxides-1,2-epoxybutane, ethyl glycidyl ether (aliphatic), 3,3-dimethyl-1,2-epoxybutane (sterically hindered), 1,2-epoxy-3-phenoxypropane (aromatic-based, with ether group), (2,3-epoxypropyl)benzene (aromatic-based, bo ether groups), 4-chlorophenyl glycidyl ether (contains a halogen with epoxide); (ii) diepoxides-1,4-butanediol diglycidyl ether (aliphatic, with ether groups), 1,2,7,8-diepoxyoctane (aliphatic, no ether groups), 1,4-cyclohexanedimethanol diglycidyl ether (aliphatic with cyclohexane group), resorcinol (aromatic-based with ether groups), bisphenol A diglycidyl ether (multiple aromatic groups), poly(Bisphenol A-co-epichlorohydrin), glycidyl end-capped (multiple aromatic groups, polymer), D.E.R 332 (bisphenol A based commercial polymer), EPON 826 (bisphenol A based commercial polymer); (iii) triepoxide-tris(2,3-epoxypropyl) iso-cyanurate (cyanurate groups), tris(4-hydroxyphenyl)methane triglycidyl ether (aromatic-based, with ether groups), Heloxy 48 (commercial polymer); (iv) tetraepoxide-4,4'-methylenebis(N,N-diglycidylaniline) (aromatic based, with tertiary amine groups), tetraphenylolethane glydidyl ether (aromatic based). Note that these silica-supported sorbent formulations are derivatives of those for pure polyamine-polyepoxide polymer monolith materials in chunk and particle forms that were previously published [1] and are incorporated herein in their entirety. Generally, the porous polymer monoliths were synthesized by reacting 10 wt % of the polyamine (PEI800 or TEPA) and polyepoxide [bisphenyl A diglycidyl ether (commercial D.E.R 332, E2, DOW, diepoxide); N—N-diglycidyl-4-glycidyloxyaniline (Sigma Aldrich, tri-epoxide, E3); or 4,4'-methylenebis (N,N-digyl-cidylaniline (Sigma Aldrich, tetra-epoxide, E4)] monomer mixtures in a polyethyleneglycol (PEG) porogen/pore template at 105° C. for 3 hours, removing PEG by washing the resulting gels (10.0 g) with 3 changes of 200 mL of MeOH for 2 days, and then removing MeOH by drying in a vacuum oven for 16 hours to produce the monolith chunks. Monolith particles were formed upon grinding the monolith chunks. In at least one embodiment, the PEG porogen was not needed in the preparation of the silica-supported, monolith-based sorbents due to the already porous nature of silica.

In yet another embodiment of the particle sorbent, the PEI800 was combined with acrylamide-based crosslinkers instead of epoxysilanes or polyepoxides. An array of basic immobilized amine sorbents (BIAS) was prepared by the following method. First, 3.0-8.0 g of PEI800 was dissolved in 40 mL of DI water and 40 mL of methanol in a 250 mL flask. 10 g of silica ($SiO_2$, 100 μm or 500 μm, PQ CS 2129, PQ Corp.) was added to the $PEI/H_2O$/MeOH solution and the resulting mixture was degassed for 15 min by purging $N_2$ gas. Then 0.2-0.35 g of ammonium persulfate (APS) and 100-200 μL of N,N,N',N'-Tetramethylethylenediamine (TMEDA) were added. The resulting mixture was gently rotated for an additional 10 min at 70° C. to generate free radicals on PEI and $SiO_2$. A well-mixed solution containing 0-1.0 g of Acrylamide, 1-4.0 g of N,N'-Methylenebis(acrylamide) (MBAA) and 20 g of methanol was degassed for 10 min and transferred into the flask. The solution was stirred at 220 rpm at 800 mbar vacuum for 2 hours and then sequentially pulling a vacuum of 400-100 mbar for additional 2 hours. The product was rinsed with DI water to remove loosely attached compounds and dried in an oven at 70° C. overnight to get the final product. Note that these silica-supported sorbent formulations are derivatives of those for pure polymer hydrogel materials that were previously published [2] and are incorporated herein in their entirety. Alternative acrylic-based crosslinkers may include the following: ethylene glycol diacrylate (EGDA), PEG diacrylate (PEGDA), 1,3-Butanediol diacrylate, 1,6-Hexanediol diacrylate (HDODA), Bisphenol A ethoxylate diacrylate, 1,4-Butanediol diacrylate, Glycerol 1,3-diglycerolate diacrylate, Neopentyl glycol diacrylate, Tetra(ethylene glycol) diacrylate (TTEGDA), Poly(propylene glycol) diacrylate, Fluorescein O,O'-diacrylate, Bisphenol F ethoxylate (2 EO/phenol) diacrylate, 1,1,1-trimethylolpropanetriacrylate (TMPTA), and tetraalyloxy ethane (TAOE). Alternative initiators may include the following: as potassium persulfate, benzoyl peroxide, and 2-Hydroxy-4'-(2-hydroxyethoxy)-2-methylpropiophenone.

Composition Analysis

In a composition analysis of organic content, volatiles and inorganic content were determined using a Mettler Toledo STAR$^e$ TGA-DSC unit operating from 30 to 1200° C., under a 100 ml/min air purge with an oven temperature ramp rate of 15° C./min using a 20 mg aliquot of the sorbent in a 150 μl platinum TGA pan. CHNSO analysis was performed on a Perkin Elmer 2400 series II CHNSO analyzer using a 1.5-2.5 mg sample. The analyzer was fitted with a combustion tube made of quartz glass, packed with quartz wool, tungsten oxide, and CinoiCopper wire. The Combustion oven temperature was 975° C. with ultra-pure helium carrier gas set for 20 psi, the reduction oven temperature was 500° C. with a feed gas of ultra-pure oxygen at 15 psi. The instrument was calibrated using a K-factor (Cystine) right before analysis. TEPA Pentachloride $C_8H_{28}N_5Cl_5$ was used as a reference standard for C, H and N content of the amine. Found: (C=26.20%, H=7.66%, N=19.53%), calculated: (C=25.85%, H=7.59%, N=18.84%).

Amine Leach Testing and Sorbent Washing

In amine leach testing and sorbent washing, a general amine leaching experiment was performed for the rapid stability assessment of basic immobilized amine sorbents (BIAS) toward amine leaching (1), using 0.5 grams of sorbent and flowing 20 ml of room temperature DI water at a flow rate of 0.5 ml/min (~10 bed volumes at 0.26 bed volumes per min). In the instant case, multiple repetitions of 20 ml aliquots of DI water were employed on the same 0.5 g subsample to ensure complete sorbent stability under continuous exposure during practical applications in metal capture. Furthermore, the leachates were examined by UV-vis to quantify the amount of amine that leached in each fraction. TGA organic content was determined on the initial, unwashed sample and on the final sample after multiple washing to evaluate the percentage of organic content retained (OCR).

ICP-MS Quantitation of Metal Concentration and Ion Chromatography for Quantitation of Anions In one embodiment, ICP-MS quantitation of metal concentration and ion chromatography for quantitation of anions, was performed while data was collected on a Nexion 300D Inductively Coupled Plasma Mass Spectrometer (Perkin Elmer) in Kinetic Energy Discrimination (KED) mode using UHP He at a rate of 2 ml/minute as the collision gas. Before analysis, samples were diluted in 2% $HNO_3$. Anion data were collected on an unacidified ThermoScientific Dionex ICS 3000 ion chromatograph equipped with a conductivity detector, after a 10-fold dilution in deionized water.

Metal Uptake Experiments

In both the batch and flow experiments, the metal uptake capacity was determined as described hereafter. Total metal uptake ($C_B$) was determined by the difference between the initial feed metal concentration $C_i$ and the final column eluent concentration $C_f$ as shown in Equation 1:

$$C_B = C_i - C_f \qquad \text{Equation 1}$$

The uptake capacity, Q, is then given by the calculated metal uptake ($C_B$) multiplied by the volume of treated solution (V), then divided by the mass of the sorbent (m) as shown in Equation 2:

$$Q = C_B * V/m \qquad \text{Equation 2}$$

In the case of the flowing tests, the breakthrough concentration ($B_C$) point was defined as the column eluent fraction in which the uptake percentage dropped below 98% uptake efficiency such that Equation 3 was fulfilled:

$$B_C = 100*(C_B/C_i) < 2 \qquad \text{Equation 3}$$

The working capacity in the flow-based system for mixed elements was defined and quantified as the total metal uptake from solution from the volume, V=0 up to the eluted volume $V_{BC}$ at which $B_C$ is achieved such that:

$$Q_W^M = \Sigma_{C_i}^{CB}(C_{i,B})V_{BC}/m \qquad \text{Equation 4}$$

Single Element Selectivity, $\varphi_M$, for each metal, $M_1$, relative to another metal $M_2$, was calculated from the ratio of the uptake capacities $Q_M$ s as shown in Equation 5 such that:

$$\phi_{M_{12}} = Q_{M_1}/Q_{M_2} \qquad \text{Equation 5}$$

Internal consistency for the end point of the breakthrough curve ($B_F$) was measured by the total mmol of halide, Cl, to the sum total mmol of all metals, M, in any fraction such that when binding to the sorbent approaches completion, the molar ratio of metal ions to chloride ions will approach the formula of $MCl_3$. In other words, Equation 6 becomes true:

$$B_F = ([Cl]/\Sigma_i^j[M]_{ij}) \cong 3 \qquad \text{Equation 6}$$

Initial screening metal uptake experiments were performed on ~0.5 grams of sorbent placed into a glass Bio-Rad 11 mm ID, low pressure chromatography column fitted with porous fit resulting in a sorbent bed volume of ~2 ml. Metal solutions 20 ml (~10 bed volumes at 0.26 bed volumes per min) of 100 ppm concentration were flowed over the sorbent bed at a flow rate of 0.5 ml/min by means of a peristaltic pump (Bio-Rad) at ambient temperature and pressure. Alternatively, 0.25 g of sorbent was used with 10 ml of feed solution and ~1 ml bed volume at 0.5 bed volumes per min. An aliquot of the feed solution and the column eluent were analyzed by ICP-MS for metal content and ion chromatography for common inorganic anions.

Selectivity and Breakthrough Experiments

In one or more embodiments selectivity experiments were conducted either as batch uptake experiments or using the Bio-Rad system setup for general metal uptake with the addition of a flow through conductivity detector, UV-detector and fraction collector.

Batch selectivity experiments were performed on 0.25 g of sorbent in 20 ml of metal solution with continuous shaking for 60 minutes with metal uptake determined by ICP-MS and common anions determined by IC.

Regeneration Experiments

One or more embodiments of regeneration experiments, where a typical regeneration was initially setup as described for the flow through binding experiments with 20 ml aliquot of metal feed solution flowed over a 0.5 gram (~1.8 ml) sorbent bed at 0.5 ml/min (0.26 bed volumes per min). Metal release experiments tested both multi-step release (acidic solution; acetic acid) and regeneration cycles (basic solution; NaOH) as well as a single step release and regeneration (ammonium citrate), with a DI water release/regeneration experiment as a control. All experiments were performed by cycling three times.

NETL 181D Synthesis and Characterization,

Embodiments relate to NETL 181D Synthesis and Characterization, where in general, a 90-95% yield is commonly achieved after the synthesis of the material. A representative TGA-DSC analysis of the freshly prepared material gave 1.8% (w/w) volatile content, 28.0% (w/w) organic content (dry basis) and 72.0% inorganic content (dry basis). Similarly, the CHNSO elemental composition analysis yielded 28.02% (w/w; dry basis) organics with C=15.46%, H=4.15%, N=8.41% which is also in good agreement with the calculated theoretical weight percent of organic (31.7%). The apparent packing density of the material in a column was found to be 0.26 to 0.35 g/ml (~2.8-3.8 ml column bed volume per gram).

NETL 181D Performance Testing:
Water Stability

Water stability testing demonstrated 94.5% OCR by TGA; 94.3% OCR by UV-Vis after leach testing with 10-20 bed volumes of DI water on a freshly prepared sample. In a second longer exposure of ~200 bed volumes, an OCR value of 96.6%, suggesting that the sorbent is stable after a minimal amount of initially unbound amine is lost.

General Metal Uptake

Overall, 4 heavy metals, 8 rare earth elements and 4 alki/alkaline earth elements were tested for their adsorption from control solutions, tap water, simulated acid mine drainage, and simulated seawater using both batch absorption and flow through metal uptake methods. In all cases the alkali and alkaline earth metals did not absorb to the sorbent when tested at concentrations ranging from 10-20,000 ppm and still allowed for the absorption of heavy metals, in the ppb to low ppm concentration range, while REEs were absorbed in the 5 ppt to 1000 ppm. Although metal adsorption is typically affected by the pH of the starting solution, effective heavy metal and REE uptake were still observed from pH ~2.4 to pH 8.3 for our materials. Table 3 illustrates the various formulations of the sorbent that were tested for comparative metal uptake using La.

TABLE 3

Sorbent formulations, relative uptake of La as $LaCl_3$ and organic content retention (OCR) during water exposure

| Sorbent | Composition[a, b] | Stock La (ppm) | Bound La (ppm) | Uptake[c] (%) | OCR (%) |
|---|---|---|---|---|---|
| NETL 181D | $PEI_{800}$-ECTMS | 93 ± 2 | 83 ± 7 | 89 ± 7 | 105 ± 7 |
| NETL 040B | 181D-500 μm | 85.1 | 84.8 | 99.7 | 106.9 |
| NETL 002A | E100-181D | 85.1 | 81.2 | 95.5 | 96.6 |
| NETL 002B | TEPA-181D | 85.1 | 81.3 | 95.5 | 89.7 |
| NETL 106B | $PEI_{2000}$-181D G10 (3 mm) | 109.5 | 31 | 28.3 | ND |
| NETL 106C | 181D on G10 (3 mm) | 109.5 | 92.5 | 84.4 | ND |
| NETL 178A | $PEI_{800}$-MCR-E11 PDMS- 500 μm | ND | ND | ND | 106.7 |
| NETL 187 | 50% -181D-500 μm- high ECTMS | 107.4 | 51.2 | 47.6 | 97.4 |
| NETL 181D | $PEI_{800}$-ES-80 μm | 445.4 | 444.3 | 99.7 | 105 ± 7 |
| NETL 140A | $PEI_{2000}$-181D-80 μm | 463.8 | 192.5 | 42 | 103.6 |
| NETL 179A | 50% -181D-500 μm | 445.4 | 85.9 | 19.3 | 98.3 |
| NETL 179B | 60% -181D-500 μm | 445.4 | 128.5 | 28.8 | 97.7 |
| NETL 19-1V3 | 11%-181D-fiberglass mat | 103.6 | 79.6 | 23 | 97 |
| NETL 19-1V4 | 20%-181D-fiberglass mat | 103.6 | 70.2 | 32 | 98 |
| 181D-Pretreated Cotton | 1.1 wt % N-pretreated cotton fibers* | ~100 | | 46.7 | |

TABLE 3-continued

Sorbent formulations, relative uptake of La as LaCl$_3$ and organic content retention (OCR) during water exposure

| Sorbent | Composition$^{a, b}$ | Stock La (ppm) | Bound La (ppm) | Uptake$^c$ (%) | OCR (%) |
|---|---|---|---|---|---|
| Pretreated cotton | Pretreated cotton fibers* (control for 181D-Pretreated cotton) | ~100 | | | 25.3 |

$^a$= nominal composition is assumed 40% total organic unless otherwise noted by a percentage preceding the general formulation,
$^b$= amine ~13% (w/w) other components ~27% (w/w) unless otherwise noted,
$^c$= percentage of initial solution,
OCR = stability parameter as percent organic content remaining after washing with water,
ES =2-(3,4-epoxycyclohexyl)ethyltrimethoxysilane,
acid pre = acid pretreated,
G10 = 3 mm silica pellet,
500 μm = PQ 2129 silica at 500 μm particle size,
80 μm = PQ 2129 silica at 80 μm particle size,
MCR-E11 PDMS = epoxy-terminated polydimethylsiloxane (Gelest),
High ES = 12% PEI$_{MN800}$ and 35% ES, 181D ES content,
ND = not determined.
*(1) mercerize-heated at 50° C. in 15 wt % NaOH solution for 3 hours and rinsed in H$_2$O, (2) hydrolyze-heated at 80° C. in H$_2$O/MeOH-10/90, pH = 4 for 2 hrs, H$_2$O rinsed, (3) functionalized with 181D recipe then washed with H$_2$O to remove unbound amines.

REE Selectivity and Kinetics

For comparison of uptake capacities obtained from within the framework of a typical flowing test, batch uptake capacities for, La, Eu and Yb were tested as pure element exposures. In each test, 10 ml of a 150 ppm solution of the individual REE was incubated with 0.25 g of sorbent for 1 hour so that a comparison could be made between the affinities of each REE towards the sorbent material when the two were in constant contact as opposed to transient flowing contact. Under these specific conditions and metal concentrations, the relative max. uptake capacities were determined to be: $Q_{La}$=39.6, $Q_{Eu}$ 39.5 and $Q_{Yb}$=37.0 μmol/g, such that the single element selectivity was found to be approximately 1 when all three elements are compared with respect to La.

Mixed Feed Uptake Results; 5 Component REE

A 40 ml initial REE feed solution was prepared at a ~3.5 mM total concentration for all metals combined, with the actual mole percent composition determined by ICP-MS as: La 20.9%, Nd 18.4%, Eu 20.3%, Dy 20.3% and Yb 20.1%.

Figure 7:
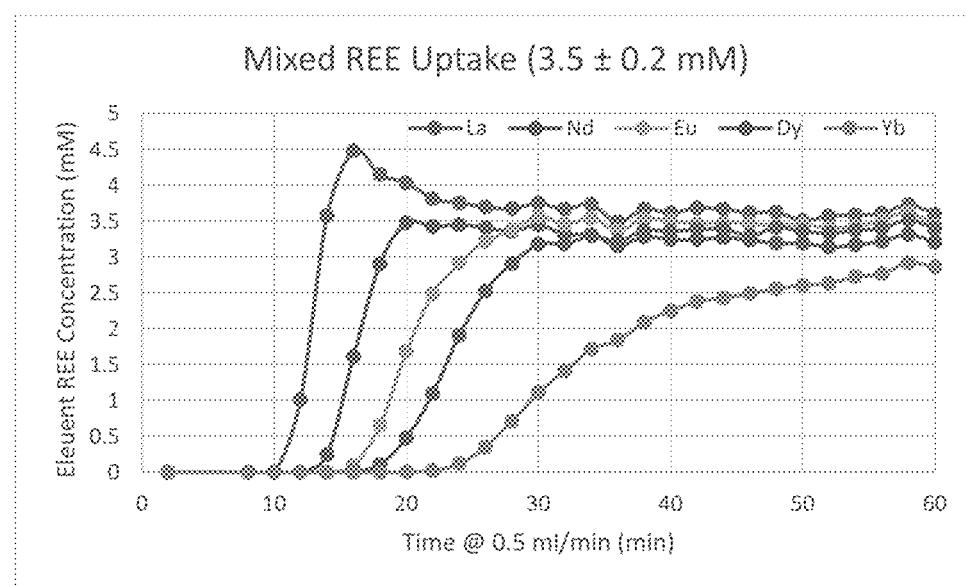
FIG. 7 depicts a graph illustrating breakthrough curves for 3.5 mM each mixed REE uptake under continuous flow with 0.5 g sorbent at 0.5 ml/min flow rate, where the plots are eluent concentration with time.
Figure 8:
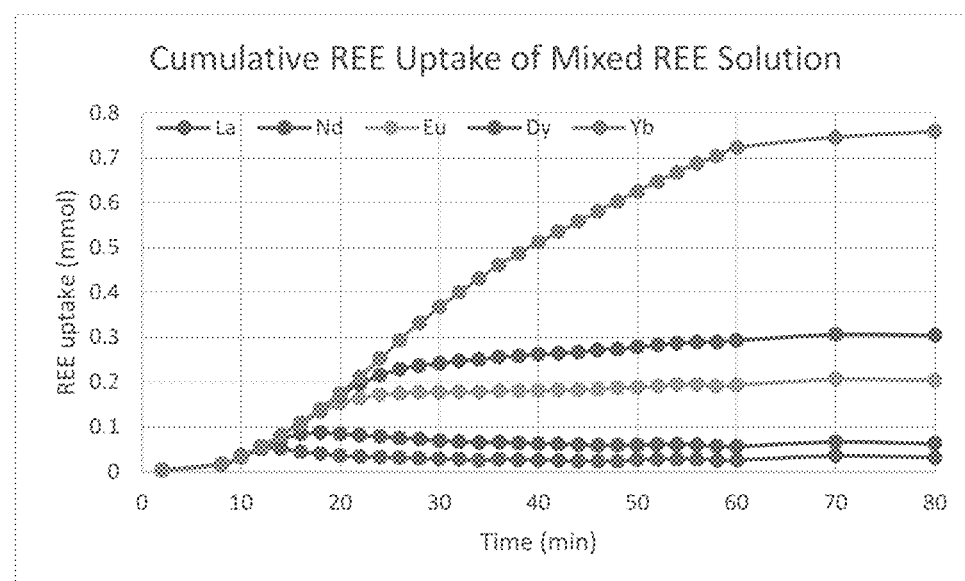
FIG. 8 depicts a graph illustrating actual uptake of 3.5 mM each mixed REE uptake under continuous flow with 0.5 g sorbent at 0.5 ml/min flow rate using data calculated from the transient concentration data in FIG. 7.

The feed (40 ml) was supplied to 0.5 g sorbent in a dry packed column with a final column volume of 1.8 ml at a rate of 0.5 ml/min at a sample collection rate of 1 fraction every 2 minutes (1 ml). Each fraction was analyzed by ICP-MS for rare earth element, major alkali and alkaline earth element composition as well as for common anions by IC, shown in FIGS. 7 and 8.

The ICP-MS data shows that although there is an initial fast uptake of La, the overall mole percentage of La uptake at any time during the run is small compared to the elements with smaller radii.

The molar composition of metals adsorbed is disproportionate to that of the initial solution as follows: La 2.3%, Nd 4.6%, Eu 15%, Dy 22.4% and Yb 55.7%. In this case, 1362 μmol of total REE was loaded after 80 minutes at an efficiency of about 2.1 N per metal atom, which is the theoretical maximum number of nitrogen donors with proximal alkyoxy donor oxygen atoms when the ring opened epoxy is considered. When the individual rare earth efficiencies are calculated at t=60 minutes and t=90 minutes, it can be seen that the system has not achieved thermodynamic equilibrium with the N-based efficiency in excess of 2 N-atoms per rare earth, with the exception Yb, but overall the N-efficiency appears to approach ~2 more rapidly as a function of decreasing atomic radius. Further agreement with the rare earth radius effects on uptake capacity is shown through the calculated breakthrough time for each element which increases with decreasing atomic radius in the rare earth series.

Single Element REE Uptake

Uptake experiments were also conducted for single elements in solution with the sorbent being exposed to ~3.6 mM feed solutions of each of La (3.6 mM), Eu (3.3 mM), Yb (3.2 mM) and Dy (3.5 mM) by ICP-MS. The feed (40 ml) was supplied to 0.5 g sorbent in a dry packed column with a final column volume of 1.8 ml at a rate of 0.5 ml/min at a sample collection rate of 1 fraction every 2 minutes (1 ml). Each fraction was analyzed by ICP-MS for rare earth element, major alkali and alkaline earth element composition as well as for common anions by IC. Working capacity is defined as the amount of metal captured/g-sorbent prior to metal breakthrough, which is defined here as eluent metal concentrations >2% of those in the initial feed solution. Total capacity is defined as the amount of metals adsorbed/g-sorbent after 60 min total adsorption time.

TABLE 4 breakthrough times for REE capture in flowing systems
Breakthrough times (min)

| element | SE | ME |
|---|---|---|
| La | 12 | 10 |
| Nd | ND | 12 |
| Eu | 26 | 14 |
| Dy | 20 | 16 |
| Yb | 26 | 22 |

SE = single element and ME = mixed element.
All times are in min at 0.5 ml/min flow rates.
ND = not determined

TABLE 5

Uptake capacities for REE capture in flowing systems

| REE | SE-WC µmmole/g | SE-TC$_{60}$ µmole/g | ME-WC µmole/g | ME-TC$_{60}$ µmole/g |
|---|---|---|---|---|
| La | 36.2 | 58.6 | 36.2 | 52.0 |
| Nd | ND | ND | 51.1 | 113.4 |
| Eu | 79.7 | 140.4 | 81.1 | 387.5 |
| Dy | 63.7 | 130.3 | 108.7 | 585.6 |
| Yb | 75.6 | 135.9 | 212.2 | 1445.5 |

SE-WC and SE-TC are the single element working capacity and total capacity respectively.
ME-WC and ME-TC are the mixed element working capacity and total capacity respectively.
Subscript indicates time in minutes.
ND = not determined In contrast to the mixed REE solution, the individual REE components, with the exception of La, behave similarly which provides good agreement with the batch uptake single element tests. However, there were two significant differences between the single element uptake experiments and the mixed feed experiments with the first being changes in working and total capacity and the second being the overall nitrogen efficiency and saturation loading. In terms of both the working capacity and the total capacity for a specific element it was observed that the sorbents uptake of Eu, Dy, and Yb, were significantly higher in feed solutions of an REE mixture, while its capacity for La showed very similar behavior in both single element and mixed REE feedstocks. In either case

TABLE 6

Calculated nitrogen efficiency per mole of metal
N Efficiency (N$_{eff}$)

| Element | SE | ME$_{60}$ | ME$_{80}$ |
|---|---|---|---|
| La | 119.0 | 134.1 | 109.0 |
| Nd | NA | 61.5 | 55.4 |
| Eu | 49.7 | 18.0 | 17.1 |
| Dy | 53.5 | 11.9 | 11.4 |
| Yb | 51.3 | 4.8 | 4.6 |
| La, Nd, Eu, Dy, Yb (FIG. 7) | | 2.3 | 2.2 |

SE = single element at t = 60 minutes,
ME = mixed element and subscript designates time point of calculation
NA = not performed There appears to be a synergistic effect on Eu, Dy and Yb when testing in mixed systems, predominantly in the total capacity after 60 minutes of REE uptake. In terms of working capacity there is a corresponding reduction in the observed working capacity for Eu and Dy, a large increase in that of Yb and little to no change in that of La.

Heavy Metal Cycling: Capture-Release-Regenerate.

Figure 9:
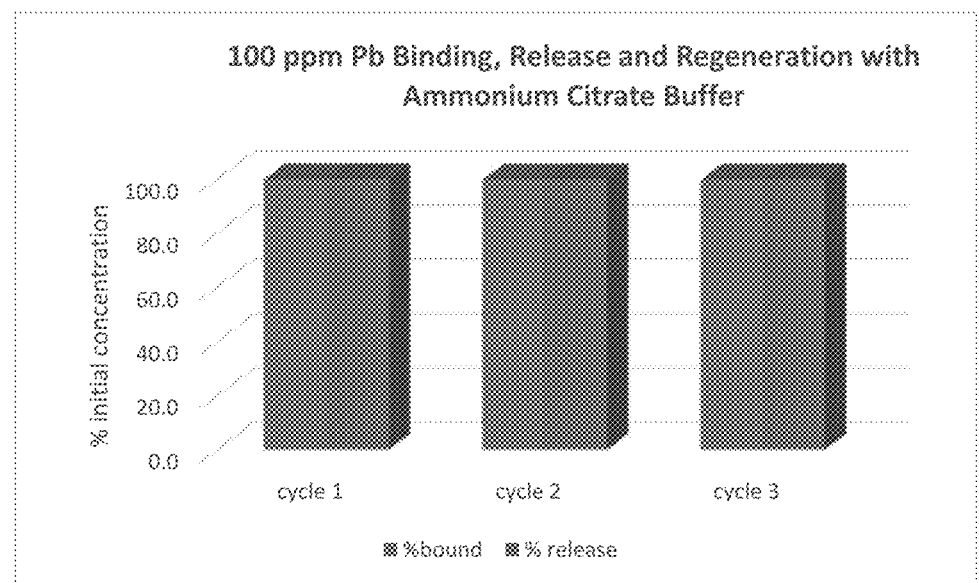
FIG. 9 depicts a graph illustrating cycling of lead as lead chloride with a single regeneration step using ammonium citrate.

As an alternative application of the sorbent to REE recovery, the PEI/ECTMS/silica sorbent was tested for removal of heavy metals, namely Pb. Recent uncovering of alarmingly wide-spread Pb contaminated municipal water supplies throughout the US highlights the dire need for a recyclable sorbent capable of removing these poisonous metals. Two experiments were conducted to assess the Pb capture of 181D from a (1) a 100 ppm Pb/RO water sample and (2) a real-world 50 ppb-spiked tap water sample. For both experiments, a single cycle began with metal capture, where 20 ml of 100 ppm of Pb as PbCl$_2$ was flowed over to 0.5 g of solid sorbent at a flow rate of 0.5 ml/min. In the experiment (1), the metal was released and the sorbent was regenerated simultaneously with 20 ml of 5% (w/w) ammonium citrate flowing at 0.5 ml/min. This sorbent was exposed to three consecutive cycles under these conditions and showed excellent stability of a ~99% Pb capture capacity (See FIG. 9). This shows that not only does our material have a high affinity for lead, but indicates that heavy metal and REE capture-release-regenerate cycling can be simplified into a single step. As a result, it was found that the sorbent may be cleared of bound metals and regenerated in as little as one step when ammonium citrate solution is used to elute the metals (See FIG. 9). This reagent presumably acts to deprotonate amine and alcohol groups on the sorbent, while simultaneously chelating the bound metal ions thus reactivating and freeing these groups for subsequent rounds of heavy metal or rare earth element binding. Alternatively, a two-step process can also be employed where one reagent is used complex bound metals and protonate the metal binding site amine and alkoxy groups, while a second reagent deprotonates the protonated binding atoms and restores the sorbent for metal complexation.

Because real-world water systems have multiple metals at varying concentrations, a 50 ppb lead spiked tap water sample was tested. In an attempt to fractionally release and elute select metals, including lead, a sequential release-regenerate scheme using both acid-base and buffer motifs was employed.

Figure 10A:
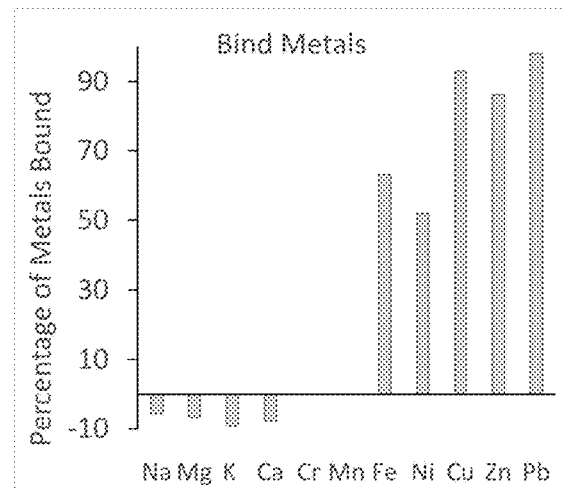
FIG. 10A depicts graph illustrating adsorption of different metals from 1 L of lead-spiked (50 ppb) tap water (Bind Metals) via the flow-through column.
Figure 10B:
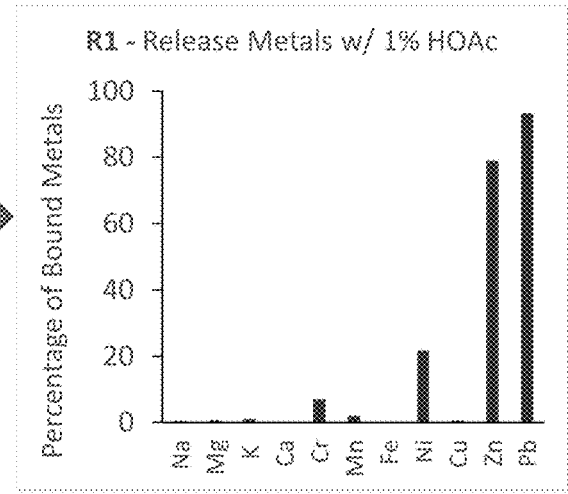
FIG. 10B depicts sequential release of bound metals with 40 mL each of 1 wt % acetic acid/OHAc (R1), then 5 wt % citric acid (R2) (FIG. 10C), and finally 5 wt % ammonium citrate (R3) (FIG. 10D)
Figure 10D:
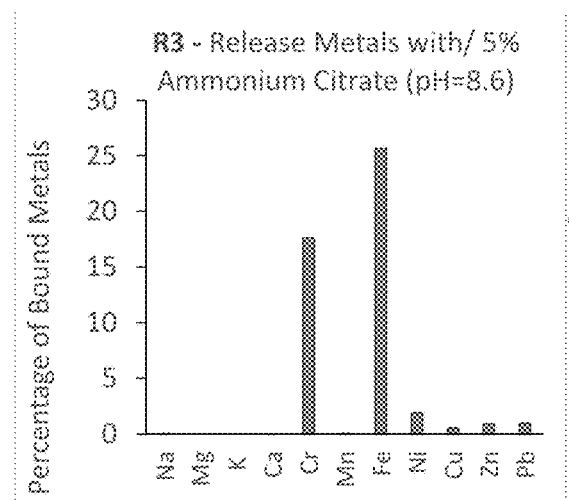
Figure 10C:
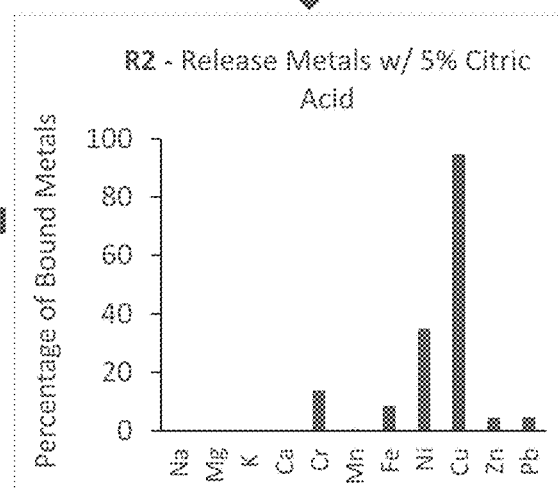

Testing the potential of fractional elution was performed using a continuous flow of 1 L of tap water at 0.5 ml/min, spiked with lead at 50 ppb, as shown in FIG. 10A, with a previously un-rinsed 0.5 g portion of the sorbent. In this way, a more practical test sample could be evaluated for application in water treatment. The initial heavy metal capture, shown in orange, indicated that the sorbent absorbed ~100% of the highly dilute lead and ~90% of the copper and zinc from the tap water, while taking lesser amounts (50-60%) of the initial iron and nickel. Moreover a slight amount of the major alkali and alkaline earth metals were released from the sorbent, which are presumably integrated into the silica support. Next, 1% acetic acid, shown in red (FIG. 10B), was employed to remove predominantly lead and zinc. This was followed by removal of mainly copper with 5% citric acid, shown in green (FIG. 10C), and lastly iron with 5% ammonium citrate, shown in blue (FIG. 10D). The chromium that was eluted was acquired on the sorbent from contact with RO water and the metal spatula use during the initial sorbent preparation, which indicates that a commercial version of the sorbent should be pre-washed with ammonium citrate prior to its first use in order to both remove pre-adsorbed metals as well as ammonium ions. This experiment clearly shows the applicability of the sorbent for use in the treatment of drinking water that is contaminated with chrome and or lead, in a format that can be cheaply and easily regenerated for re-use.

Capture of Barium and Strontium

A report released by the Environmental Protection Agency, in 2016 revealed that produced water from hydraulic fracturing operations contains up to 190 ppm of barium and 565 ppm of strontium. These chemicals are regarded as toxic, with chronic effects of oral ingestion being kidney disease/damage and ractic rosary (cartilage nodules in the ribs due to inefficient calcium mineralization). Furthermore, barium is listed as a drinking water contaminant according to the National Primary Drinking Water Regulations, NPDWRs. Because largely these plus other metal and organic contaminants make produced water a hazardous waste unsuitable for re-integration back into the environment, it is necessary to remove barium and strontium from this water source.

Figure 11:
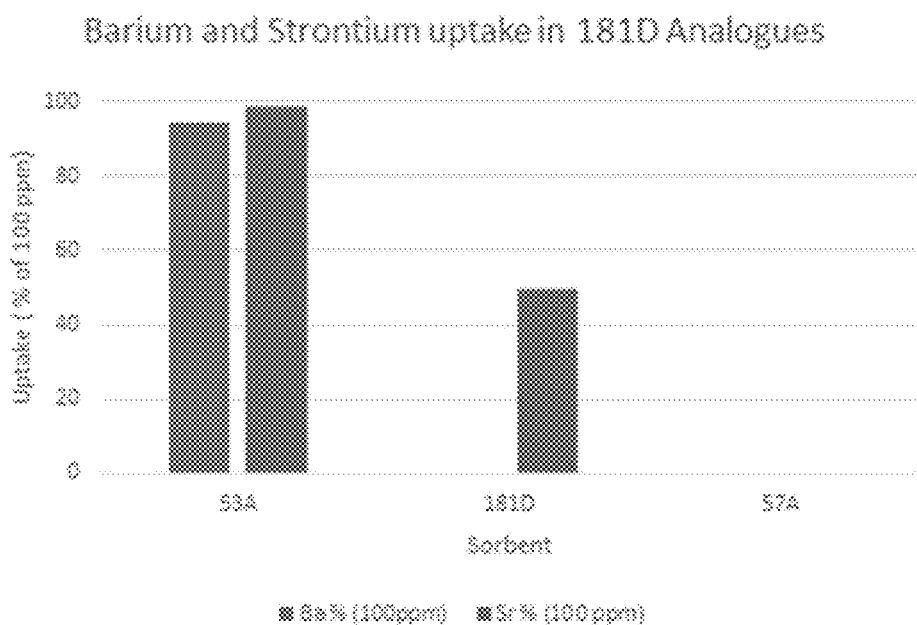
FIG. 11 depicts a graph illustrating performance testing of three sorbent formulations and the barium and strontium uptake of each.

The polyamine/epoxysilane sorbents were tested for barium (Ba) and strontium (Sr) uptake from single-element solutions of the barium chloride and strontium chloride salts or in mixed solutions of the two components. Testing of about a 2.1 ml bed size, or 0.5 g, of the selected sorbent was accomplished by flowing 20 mL of 100 ppm of each single-metal salt solution or a mixture of 50 ppm each of both salts (100 ppm total) at a rate of 0.5 mL/min. Three sorbent formulations were tested as shown in FIG. 11, which depicts a graph illustrating the performance testing of three sorbent formulations and the barium and strontium uptake of each. For completeness, the experiment was repeated with sorbent NETL 53A, using both single-element 100 ppm solutions and mixed-element solutions with 50 ppm each of Ba and Sr. NETL 53A contains 32.6 wt % organic (pre-reacted PEI800/ECTMS/500 µm silica ratio of 21/20/59), and has an OCR value of 104.3%. NETL 57A contains 27 wt % organic (pre-reacted PEI800/ECTMS/500 µm silica ratio of 9/31/60), and has an OCR value of 97.8%.

Figure 12:
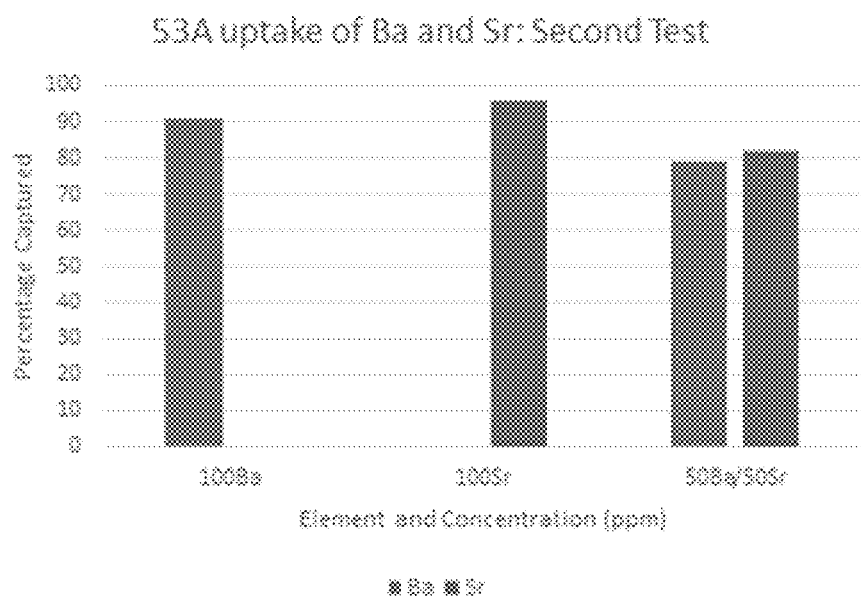
FIG. 12 depicts a graph illustrating replicate testing of NETL 53A and simultaneous uptake of Ba and Sr.

FIG. 12 depicts a graph illustrating replicate testing of NETL 53A and simultaneous uptake of Ba and Sr. The results of the repeat testing with NETL 53A illustrate excellent reproducibility of the barium and strontium uptake as well as simultaneous uptake of both elements at equal part per million concentrations. These results indicate that the polyamine/epoxysilane/silica sorbents are practical for removing contaminant metals from hydraulic fracturing waters used for enhanced oil recovery and other purposes.

Capture of Heavy Metals and Rare Earth Elements from Acid Mine Drainage

The U.S. Department of Energy evaluated REE concentration data of water samples reported in 71 studies of undisturbed water sources. The REE concentrations of different water sources were the following: river, 15-270 pmol/kg; groundwater, 5.7-410 pmol/kg; seawater, 1.6-13 pmol/kg; lake, 1.4-40 pmol/kg; (all ppt level concentrations). Mining activities have caused a significant increase in some of these aqueous REE concentrations, up to a reported 7-59 ppb for acid mine drainage (AMD) contaminated streams. This contamination results from the contact of newly exposed mineral formations to environmental REE leaching conditions, either through mining activities or the erosion of different geologies by the weather. AMD is one of the most lucrative sources for REEs due to their relatively high concentration, and so the polyamine/epoxysilane/silica sorbents were tested for their REE recovery from a simulated AMD solution.

A typical synthetic acid mine drainage solution was prepared to a final pH of 2.4±0.2 with trace levels of rare earth elements as shown in Table 7. These metal concentrations are representative of those of actual AMD solutions described in the literature. The concentrations shown in Table 7 are an average of n=3 replicate measurements of a single large batch of synthetic AMD prepared in our lab.

TABLE 7

Composition of Synthetic Acid Mine Drainage Feed Solution

| element | ppm | element | ppb |
|---|---|---|---|
| Na | 276.4 ± 8.2 | La | 15.5 ± 0.3 |
| Mg | 10.2 ± 0.4 | Nd | 24.8 ± 0.3 |
| Al | 13.6 ± 0.3 | Eu | 2.6 ± 0.02 |
| K | 0.1 ± 0.03 | Dy | 8.4 ± 0.1 |
| Ca | 58.1 ± 1.9 | Yb | 4.5 ± 0.1 |
| Mn | 54.0 ± 0.8 | | |
| Fe | 265.2 ± 5.4 | | |

A typical test protocol for assessing the uptake of metals from AMD by the 181D sorbent under flowing conditions is described here: ~0.5 g of 181D sorbent (~2.1 ml bed volume) was loaded into a 5 ml Bio-Rad low pressure chromatography column and pretreated with about 20 g of a 1% (v/v) aqueous acetic acid solution, followed by additional pretreatment of the acid-washed sorbent with about 20 g of 5% (w/v) ammonium citrate solution at pH 8.4. All pretreatment and testing solutions' flow rates were maintained at 0.5 ml/min, and the column eluent was collected for ICP-MS analysis.

Once the sorbent was pretreated with the acid and the citrate buffer solutions, 40 ml of synthetic acid mine drainage were flowed through the column and over the sorbent. Following, the captured metals were eluted by flowing 20 ml of 1% (v/v) acetic acid solution over the sorbent, followed by flowing 20 ml of 5% (w/v) ammonium citrate solution at pH 8.4. This series of treatments defined one sorbent cycle and a total of three such cycles were completed for each sorbent formulation. All eluent fractions were analyzed by ICP-MS for rare earth elements.

To evaluate the performance of the pure polymer polyamine/epoxysilane sorbent towards heavy metals uptake, a sorbent labeled 95A with a pre-reactedPEI800/ECTMS weight ratio of 14/28 was tested in parallel with 181D (pre-reacted PEI800/ECTMS weight ratio of 12/28) for copper uptake from a 75 ppm Cu' solution at pH-5.5. Both these sorbents captured 95% of the copper ions, highlighting the viability of the pure polymer polyamine/epoxysilane sorbent for removing heavy metals, and likely REEs, from water sources.

The spent 181D-sorbent was analyzed for its retention of the impregnated organics (organic stability testing) by carbon-hydrogen-nitrogen-sulfur-oxygen (CHNSO) elemental analysis, and the results are shown in Table 8.

TABLE 8

Organic Stability of the 181D Formula.

| | Carbon | Hydrogen | Nitrogen | total (C + H + N) | % Retained |
|---|---|---|---|---|---|
| Fresh 181D | 19.13 | 3.51 | 5.03 | 27.7 | 100 |
| RO rinse 181D | 18.77 | 3.33 | 4.89 | 27.0 | 98 |
| syn-AMD 181D | 19.12 | 3.09 | 4.33 | 26.5 | 96 |

The results confirm that the sorbent retains most of its organic contents (displays high stability) during pH cycling from pH ~2.4 to pH ~8.4 and over 100 column volumes of eluent liquid. The retention of organic content by the sorbent is expected to be near 100% after a more thorough pretreatment process to remove the remaining non-immobilized organic species. Results of the uptake and release cycles conducted with AMD solution can be found in FIGS. 13A-13B.

FIG. 13A depicts the average 3-cycle uptake of alkali/alkaline metals, heavy metals, and REEs from synthetic acid mine drainage solutions, while FIG. 13B. depicts sequential and total release of metals from the sorbent during cycle testing.

FIGS. 13A-13B clearly show nearly 100% uptake of Al and Nd through Yb plus about 70% uptake of La. Most importantly, there was no significant uptake of the alkali/alkaline earth metals (Na, Ca, Mg, K) and low uptake of Fe and Mn despite the exceedingly high fouling metals (all non-REE metals)/REE ratio of 12,000/1. These data confirm the efficacy of the polyamine/epoxysilane, especially 181D, for the removal of a variety of metals from acid mine drainage solution.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A stable and regenerable immobilized amine sorbent, characterized by:
   covalently immobilized polyamine covalently attached to a silica surface by an epoxysilane, wherein the covalently immobilized polyamine includes polyethylenimine having a molecular weight of 800, wherein the epoxysilane is 2-(3,4-epoxycyclohexyl)ethyltrimethoxysilane.

2. The immobilized amine sorbent of claim 1, further comprising an epoxide functionalized on the silica surface, wherein the epoxide comprises a mono-epoxide terminated polydimethylsiloxane or a di-epoxide terminated polydimethylsiloxane or an aminosilane.

3. The immobilized amine sorbent of claim 2, wherein the aminosilane is selected from the group consisting of 3-aminopropyltrimethoxysilane, N-[3-(trimethoxysilyl) propyl] ethylenediamine, and N-[3-(trimethoxysilyl)propyl]diethylenetriamine.

4. A method of making a stable and regenerable immobilized amine sorbent composition, comprising:
   selecting an amount of different polyamines and epoxysilane; and
   combining the selected amounts of different polyamines with the epoxysilane, forming the sorbent,
   wherein the polyamines are covalently attached to a silica surface by an epoxysilane,
   wherein the polyamines include polyethylenimine having a molecular weight of 800, and
   wherein the epoxysilane is 2-(3,4-epoxycyclohexyl)ethyltrimethoxysilane.

5. The method of claim 4, wherein the amount of different polyamines and epoxysilanes is selected based on at least an amount of rare earth elements to be captured.

6. The method of claim 4, further comprising combining silica with the selected amounts of different polyamines with an epoxysysilane.

7. The method of 4, further comprising aminosilane.

8. The method of claim 7, wherein the aminosilane is selected from the group consisting of 3-aminopropyltrimethoxysilane, N-[3-(trimethoxysilyl)propyl]ethylenediamine, and N-[3-(trimethoxy silyl)propyl]diethylenetriamine.

9. A method of using a stable and regenerable sorbent material to capture a rare earth element from a source, the sorbent material characterized by:
   covalently immobilized polyamine covalently attached to a silica surface by an epoxysilane, wherein the covalently immobilized polyamine includes polyethylenimine having a molecular weight of 800,
   wherein the epoxysilane is 2-(3,4-epoxycyclohexyl)ethyltrimethoxysilane;
   the method comprising:
      exposing the sorbent material to the liquid source; and
      capturing at least one rare earth element in the source.

10. The method of claim 9, further comprising rare earth element-adsorbing sites within low cost silica particles.

11. The method of claim 9, further comprising releasing the adsorbed metals and regenerating the sorbent material.

12. The method of claim 9, wherein the at least one rare earth element is selected from the group consisting of La, Ce, Nd, Eu, Pr, Y, Dy, Yb, Pm, Sm, Gd, Tb, Ho, Er, Tm, and Lu.

13. The method of claim 9, further comprising pre-concentrating the at least one rare earth element to ppm levels.

14. The method of claim 9, further comprising selectively releasing critical heavy metals from the source.

15. The method of claim 14, wherein the critical heavy metals are selected from the group consisting of Pb, Cu, Zn, Fe, Al, Mn, Ni, and Mg.

16. The method of claim 9, wherein the source is a liquid source.

17. The method of claim 16, wherein the liquid source is water from hydraulic fracturing.

18. The method of claim 16, wherein the liquid source is acid mine drainage.

19. The method of claim 16, further comprising capturing at least one heavy metal.

20. The method of claim 19, wherein the at least one heavy metal is selected from the group consisting of Pb, Cu, Zn, Fe, Al, Mn, Ni, Mg, La, Ce, Nd, Eu, Pr, Y, Dy, Yb, Pm, Sm, Gd, Tb, Ho, Er, Tm, and Lu.

21. A method of using a stable and regenerable sorbent material to capture an element from a source, the sorbent material characterized by:
   covalently immobilized polyamine covalently attached to a silica surface by anepoxysilane, wherein the covalently immobilized polyamine includes polyethylenimine having a molecular weight of 800, wherein the epoxysilane is 2-(3,4-epoxycyclohexyl)ethyltrimethoxysilane;

the method comprising:
    exposing the sorbent material to the liquid source; and
    capturing at least one naturally occurring element in the source.

22. The method of claim 21, wherein the naturally occurring element is barium.

23. The method of claim 21, wherein the naturally occurring element is strontium.

* * * * *